(12) United States Patent
Cohen et al.

(10) Patent No.: US 11,945,355 B2
(45) Date of Patent: Apr. 2, 2024

(54) CONSUMER PRODUCTS SHOWROOM

(71) Applicants: Benjamin Cohen, Brooklyn, NY (US); David Hazan, Brooklyn, NY (US)

(72) Inventors: Benjamin Cohen, Brooklyn, NY (US); David Hazan, Brooklyn, NY (US)

(73) Assignee: Bobcar Media, LLC, New York, NY (US)

( * ) Notice: Subject to any disclaimer, the term of this patent is extended or adjusted under 35 U.S.C. 154(b) by 64 days.

(21) Appl. No.: 15/331,887

(22) Filed: Oct. 23, 2016

(65) Prior Publication Data

US 2018/0111539 A1 Apr. 26, 2018
US 2022/0118900 A9 Apr. 21, 2022

Related U.S. Application Data

(63) Continuation of application No. 14/337,727, filed on Jul. 22, 2014, now Pat. No. 9,481,283, which is a continuation of application No. 14/244,601, filed on Apr. 3, 2014, now abandoned, which is a continuation of application No. 13/533,276, filed on Jun. 26, 2012, now Pat. No. 8,690,215, which is a continuation-in-part of application No. 13/018,787, filed on Feb. 1, 2011, now Pat. No. 8,220,854, which is a continuation of application No. 12/380,989, filed on Mar. 5, 2009, now Pat. No. 7,942,461, said application No. 14/244,601 is a continuation-in-part of application No. 29/447,050, filed on Feb. 28, 2013, now Pat. No. Des. 736,675, which is a continuation of application No. 29/410,762, filed on Jan. 11, 2012, now Pat. No. Des. 678,823, which is a continuation of application No. 29/360,773, filed on Apr. 30, 2010, now Pat. No. Des. 652,353, which is a
(Continued)

(51) Int. Cl.
| | |
|---|---|
| *G09F 21/04* | (2006.01) |
| *B60P 3/025* | (2006.01) |
| *B60R 13/00* | (2006.01) |
| *B62D 33/027* | (2006.01) |
| *B62D 61/06* | (2006.01) |

(52) U.S. Cl.
CPC ............ *B60P 3/0255* (2013.01); *B60R 13/00* (2013.01); *B62D 33/0276* (2013.01); *B62D 61/06* (2013.01); *G09F 21/04* (2013.01); *G09F 21/048* (2013.01)

(58) Field of Classification Search
CPC ....... B60P 3/025; B60P 3/0255; B60P 3/0257; B62D 33/0276; B62D 61/08; G09F 21/04; G09F 21/048
USPC .......................................................... 296/21
See application file for complete search history.

(56) References Cited

U.S. PATENT DOCUMENTS

| | | | | |
|---|---|---|---|---|
| 3,215,226 A | * | 11/1965 | Heyl, Jr. ................. | B60P 3/025 187/222 |
| 4,019,773 A | * | 4/1977 | Vehling ................. | B60P 3/0255 296/21 |

(Continued)

*Primary Examiner* — Gregory A Blankenship
(74) *Attorney, Agent, or Firm* — Goldberg Cohen LLP

(57) ABSTRACT

Methods and apparatus for advertising, promoting, marketing and/or selling products and services. The inventions include a mobile vehicle and moving showroom for advertising, promotion, marketing, and sales of products and services. The products and services may be promoted for direct sale from the moving showroom, or for sale from other outlets, such as retail stores and internet sales.

21 Claims, 23 Drawing Sheets

Related U.S. Application Data continuation-in-part of application No. 12/380,989, filed on Mar. 5, 2009, now Pat. No. 7,942,461, said application No. 13/018,787 is a continuation of application No. 29/364,594, filed on Jun. 25, 2010, now Pat. No. Des. 653,993, which is a continuation-in-part of application No. 29/360,773, filed on Apr. 30, 2010, now Pat. No. Des. 652,353, which is a continuation-in-part of application No. 12/380,989, filed on Mar. 5, 2009, now Pat. No. 7,942,461, said application No. 29/410,762 is a continuation-in-part of application No. 29/364,594, filed on Jun. 25, 2010, now Pat. No. Des. 653,993, which is a continuation-in-part of application No. 29/360,773, filed on Apr. 30, 2010, now Pat. No. Des. 652,353, which is a continuation-in-part of application No. 12/380,989, filed on Mar. 5, 2009, now Pat. No. 7,942,461, said application No. 29/447,050 is a continuation of application No. 13/533,276, filed on Jun. 26, 2012, now Pat. No. 8,690,215, which is a continuation-in-part of application No. 13/018,787, filed on Feb. 1, 2011, now Pat. No. 8,220,854, which is a continuation of application No. 12/380,989, filed on Mar. 5, 2009, now Pat. No. 7,942,461, said application No. 14/244,601 is a continuation-in-part of application No. 29/447,050, filed on Feb. 28, 2013, now Pat. No. Des. 736,675, which is a continuation of application No. 29/410,762, filed on Jan. 11, 2012, now Pat. No. Des. 678,823, which is a continuation of application No. 29/360,773, filed on Apr. 30, 2010, now Pat. No. Des. 652,353, which is a continuation-in-part of application No. 12/380,989, filed on Mar. 5, 2009, now Pat. No. 7,942,461, said application No. 13/018,787 is a continuation of application No. 29/360,773, filed on Apr. 30, 2010, now Pat. No. Des. 652,353, which is a continuation-in-part of application No. 12/380,989, filed on Mar. 5, 2009, now Pat. No. 7,942,461.

(60) Provisional application No. 61/068,700, filed on Mar. 7, 2008.

(56) References Cited

U.S. PATENT DOCUMENTS

| | | | | |
|---|---|---|---|---|
| 4,616,870 A * | | 10/1986 | Halden | B60P 3/0255 211/48 |
| 5,310,209 A * | | 5/1994 | Holman | B60P 3/0255 280/43.1 |
| D426,493 S * | | 6/2000 | Mertins | D12/93 |
| 6,817,653 B2 * | | 11/2004 | Ropp | B60P 3/14 224/403 |
| 7,287,349 B1 * | | 10/2007 | MacDonald | G09F 21/04 296/21 |
| D652,353 S * | | 1/2012 | Cohen | D12/93 |
| D678,823 S * | | 3/2013 | Cohen | D12/93 |
| 9,481,283 B2 * | | 11/2016 | Cohen | B60R 13/00 |
| D820,159 S * | | 6/2018 | Cavalieri | D12/85 |
| 10,919,429 B2 * | | 2/2021 | Cole | B60P 3/007 |
| 10,926,687 B2 * | | 2/2021 | Tadros | G09F 21/048 |
| 11,014,484 B1 * | | 5/2021 | Borden | B62D 39/00 |
| 2003/0038494 A1 * | | 2/2003 | Nazginov | B60P 3/0255 296/21 |
| 2004/0256872 A1 * | | 12/2004 | Piper | B60P 3/0257 296/24.36 |
| 2006/0049198 A1 * | | 3/2006 | Guard | B60P 3/0257 221/24 |
| 2007/0182181 A1 * | | 8/2007 | Cohen | B60R 13/00 296/21 |
| 2008/0052823 A1 * | | 3/2008 | Cote | B60P 3/0255 5/118 |
| 2009/0066106 A1 * | | 3/2009 | Liu | B60P 3/0255 296/37.13 |
| 2010/0032975 A1 * | | 2/2010 | Cohen | G09F 21/04 296/21 |
| 2013/0099519 A1 * | | 4/2013 | Cohen | B60R 13/00 296/21 |
| 2013/0274917 A1 * | | 10/2013 | Shimmerlik | G06Q 30/06 700/236 |
| 2014/0203584 A1 * | | 7/2014 | White | B60P 3/0257 296/22 |
| 2017/0158108 A1 * | | 6/2017 | Elbaz | B60P 3/0255 |
| 2018/0111539 A1 * | | 4/2018 | Cohen | B60P 3/0255 |
| 2019/0251883 A1 * | | 8/2019 | Borden | E04B 1/34336 |
| 2019/0337439 A1 * | | 11/2019 | Tadros | B60P 3/0255 |
| 2020/0164784 A1 * | | 5/2020 | Hill | B60P 3/0255 |

* cited by examiner

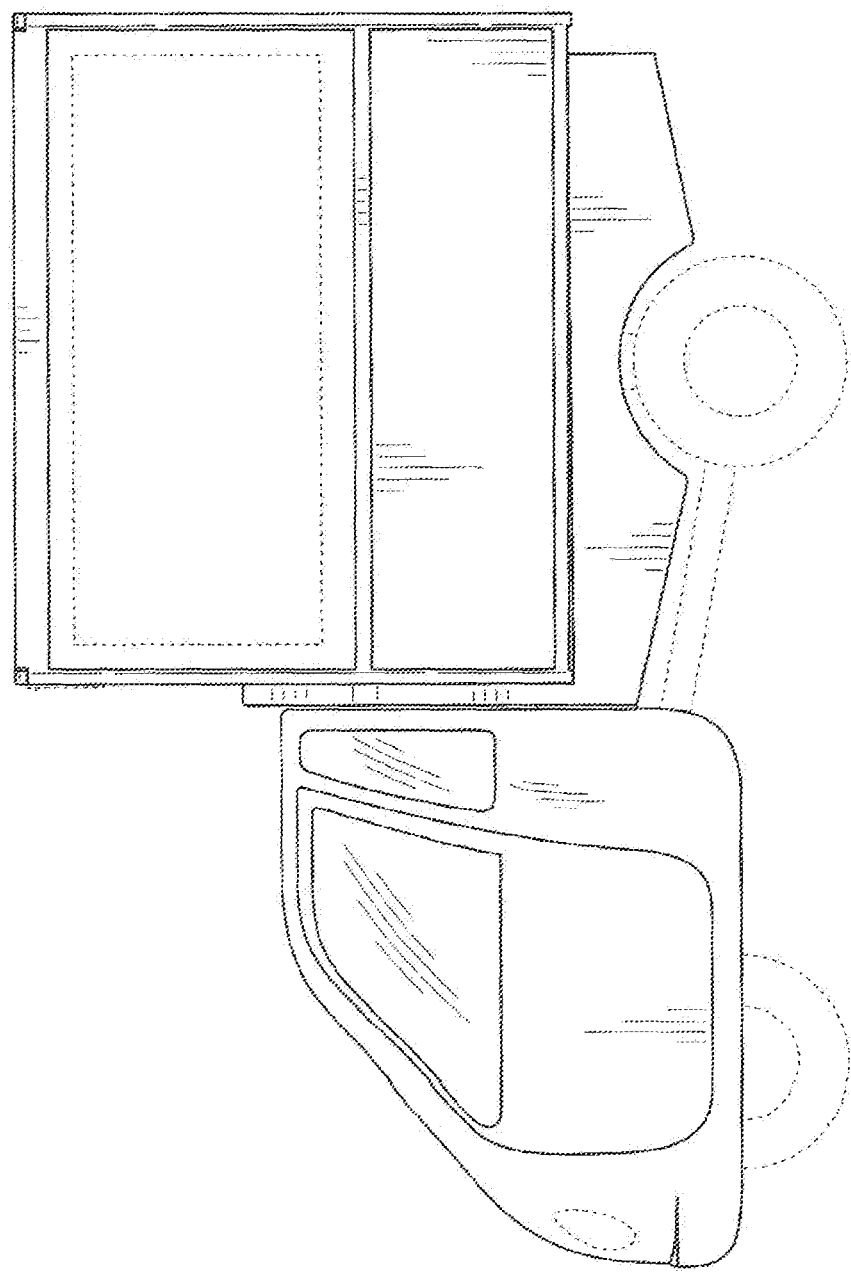

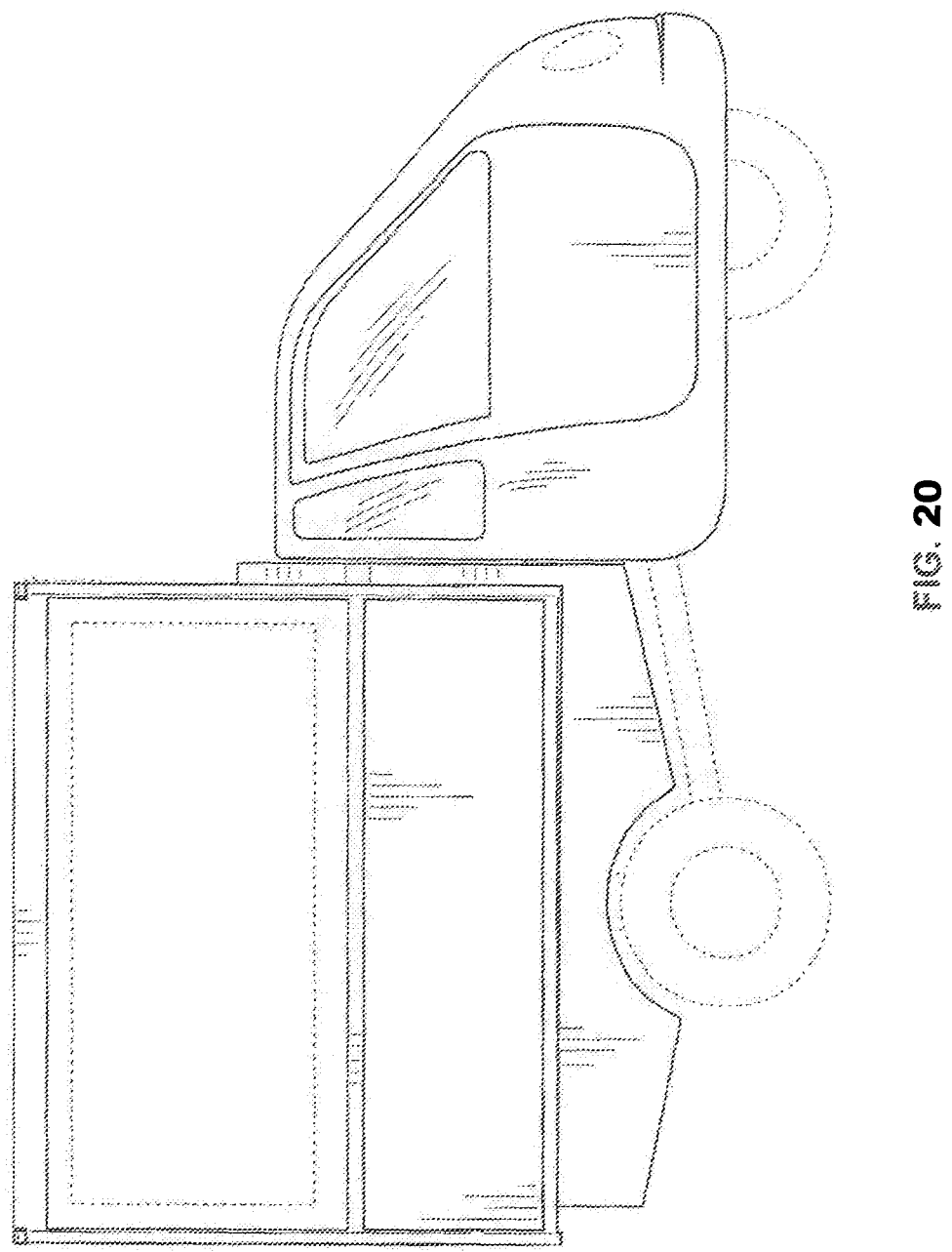

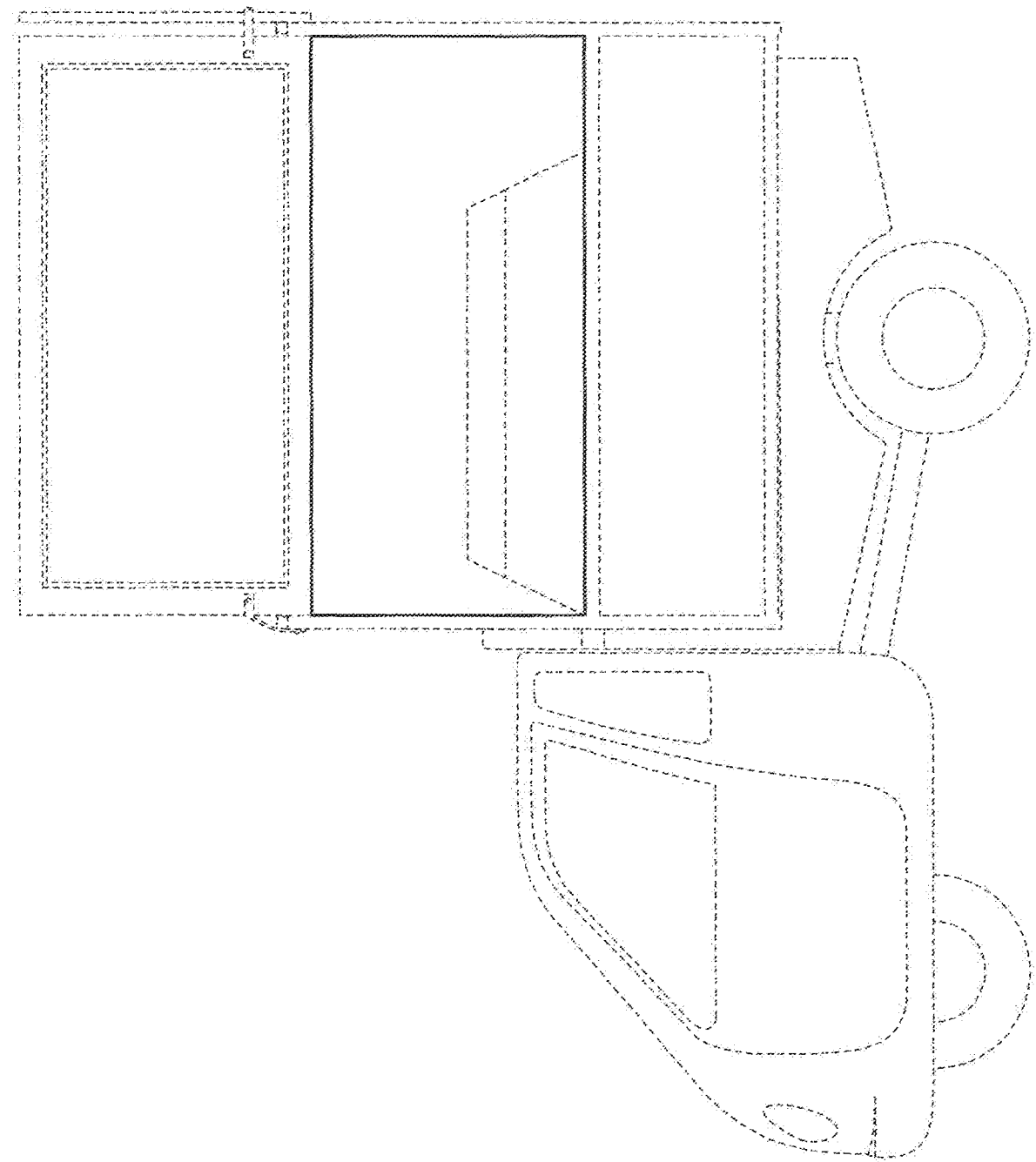

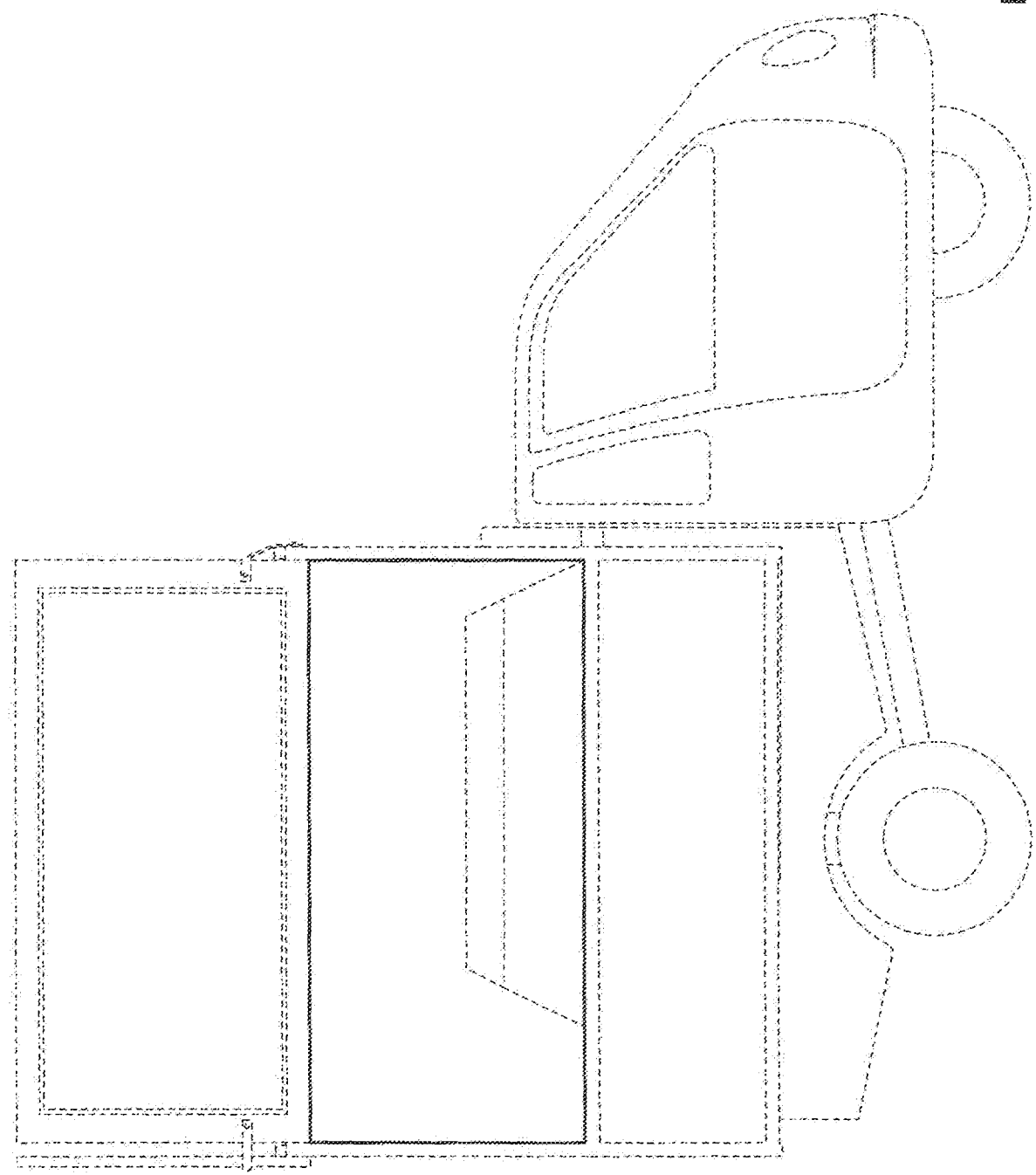

CONSUMER PRODUCTS SHOWROOM

CROSS-REFERENCE TO RELATED APPLICATIONS

This application is a continuation of U.S. patent application Ser. No. 14/337,727 filed Jul. 22, 2014 (pending), which is a continuation of U.S. patent application Ser. No. 14/244,601 filed Apr. 3, 2014 (abandoned), which is a continuation of U.S. patent application Ser. No. 13/533,276 filed Jun. 26, 2012 (patented, U.S. Pat. No. 8,690,215), which is a continuation-in-part of U.S. patent application Ser. No. 13/018,787 filed Feb. 1, 2011 (patented, U.S. Pat. No. 8,220,854), which is a continuation of U.S. patent application Ser. No. 12/380,989 filed Mar. 5, 2009 (patented, U.S. Pat. No. 7,942,461), which claims the benefit of U.S. Provisional Patent Application Ser. No. 61/068,700 filed Mar. 7, 2008.

U.S. patent application Ser. No. 14/244,601 filed Apr. 3, 2014 (pending) is also a continuation-in-part of U.S. patent application Ser. No. 29/447,050 filed Feb. 28, 2013 (pending), which is a continuation of U.S. patent application Ser. No. 29/410,762 filed Jan. 11, 2012 (patented, U.S. Pat. No. D678,823), which is a continuation of U.S. patent application Ser. No. 29/360,773 filed Apr. 30, 2010 (patented, U.S. Pat. No. D652,353), which is a continuation-in-part of U.S. patent application Ser. No. 12/380,989 filed Mar. 5, 2009 (patented, U.S. Pat. No. 7,942,461).

This application is also a continuation-in-part of U.S. patent application Ser. No. 29/447,050 filed Feb. 28, 2013 (pending), which is a continuation of U.S. patent application Ser. No. 29/410,762 filed Jan. 11, 2012 (patented, U.S. Pat. No. D678,823), which is a continuation of U.S. patent application Ser. No. 29/360,773 filed Apr. 30, 2010 (patented, U.S. Pat. No. D652,353), which is a continuation-in-part of U.S. patent application Ser. No. 12/380,989 filed Mar. 5, 2009 (patented, U.S. Pat. No. 7,942,461).

U.S. patent application Ser. No. 13/018,787 filed Feb. 1, 2011 (patented, U.S. Pat. No. 8,220,854) is also a continuation of U.S. patent application Ser. No. 29/360,773 filed Apr. 30, 2010 (patented, U.S. Pat. No. D652,353), which is a continuation-in-part of U.S. patent application Ser. No. 12/380,989 filed Mar. 5, 2009 (patented, U.S. Pat. No. 7,942,461), which claims the priority of U.S. Patent Application Ser. No. 61/068,700 filed Mar. 7, 2008).

U.S. patent application Ser. No. 13/018,787 filed Feb. 1, 2011 (patented, U.S. Pat. No. 8,220,854) is also a continuation of U.S. patent application Ser. No. 29/364,594 filed Jun. 25, 2010 (patented, U.S. Pat. No. D653,993), which is a continuation-in-part of U.S. patent application Ser. No. 29/360,773 filed Apr. 30, 2010 (patented, U.S. Pat. No. D652,353), which is a continuation-in-part of U.S. patent application Ser. No. 12/380,989 filed Mar. 5, 2009 (patented, U.S. Pat. No. 7,942,461), which claims the priority of U.S. Patent Application Ser. No. 61/068,700 filed Mar. 7, 2008).

U.S. patent application Ser. No. 29/410,762 filed Jan. 11, 2012 (patented, U.S. Pat. No. D678,823), is also a continuation-in-part of U.S. patent application Ser. No. 29/364,594 filed Jun. 25, 2010 (patented, U.S. Pat. No. D653,993), which is a continuation-in-part of U.S. patent application Ser. No. 29/360,773 filed Apr. 30, 2010 (patented, U.S. Pat. No. D652,353), which is a continuation-in-part of U.S. patent application Ser. No. 12/380,989 filed Mar. 5, 2009 (patented, U.S. Pat. No. 7,942,461).

U.S. patent application Ser. No. 29/447,050 filed Feb. 28, 2013 (pending), is also a continuation of U.S. patent application Ser. No. 13/533,276 filed Jun. 26, 2012 (pending), which is a continuation-in-part of U.S. patent application Ser. No. 13/017,787 filed Feb. 1, 2011 (patented, U.S. Pat. No. 8,220,854), which is a continuation of U.S. patent application Ser. No. 12/380,989 filed Mar. 5, 2009 (patented, U.S. Pat. No. 7,942,461).

The priority of all of those prior applications is claimed, and the contents of all of those prior applications are fully incorporated herein by reference.

FIELD OF THE INVENTION

The present invention relates to portable product displays in general and more particularly to a mobile product kiosk.

BACKGROUND OF THE INVENTION

Retail advertising and sales have historically been relegated to fixed structures such as free standing buildings or malls that include a showroom for potential customers to browse through product displays and then select the merchandise they wish to purchase. These fixed showrooms require the purchaser to make a special trip to the building location. Often, the distances involved are substantial enough to discourage the purchaser from making the journey or require more time than the purchaser has available to travel to the store.

The Internet has opened a new means of shopping for the computer literate population. Almost every product available today in the retail marketplace is also available for purchase through the Internet. With just a few strokes of the keyboard, an individual can browse a variety of products, find product comparison reviews, and select and purchase the product for delivery to the individual's home or business. However, Internet purchases require the electronic transfer of financial information such as bank account numbers or credit card numbers. While great strides have been made to insure confidentiality of such financially sensitive information, it is still subject to misappropriation and interception and misuse by unauthorized individuals. Many purchasers refuse to risk the theft of their financial and identity information and as such will not purchase products via the Internet. Also, such remote purchasing denies the purchaser the ability to view the product in a "hands on" environment such as that afforded by an in-store display.

Consumer retail malls have become very popular over the past fifty years and can now be found in almost every major metropolitan area. These malls are constructed as very large structures with a multitude of individual subdivisions for independent stores that all share a common pedestrian area for the convenience of customers. Small kiosks have also been introduced into these common areas. The kiosk is merely a small display area located in the common pedestrian traffic areas of the malls wherein each kiosk is dedicated to the sale of a single product. However, while these kiosks may be repositionable within the pedestrian area, they are also limited as to their mobility.

SUMMARY OF THE INVENTION

In a preferred embodiment, methods and apparatus are provided for advertising, promoting, marketing, and/or selling products and services, as described herein. The inventions include a mobile vehicle for such advertising, promotion, marketing and sales, wherein the vehicle is self-propelled and self-contained for transport to, and operation in, any locale. A showroom affixed to or carried by or in the moving vehicle, the vehicle acting as a moving showroom, mobile kiosk, or mobile store.

In one preferred embodiment, the showroom has side panels on three or four sides which can be raised, removed or retracted to allow customers to view the products within the showroom. Further preferably, the panels have advertising on both sides, providing advertising billboards that are visible on all of the sides of the vehicle, such that three hundred and sixty degrees of billboard signage are present on the vehicle to promote particular products and services. Those products and services can include electronics and electrical devices, mechanical products, consumer products, or other objects. The products can be promoted for sale from the moving showroom, or for sale from other outlets, whether retail stores, internet sales or so forth.

In this manner, the present system allows salespeople to promote, market, and sell products and services on a mobile platform. The vehicle allows a company to bring a showroom with items directly to the consumer in any desired environment, allowing salespeople the ability to easily and efficiently demonstrate and promote those products to consumers in that environment, such that the consumers can touch and feel them. The functions and advantages of their products and services are brought directly to consumers, rather than requiring them to come to a retail store, allowing companies and their sales people a new system for promoting, marketing, advertising and selling those products.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the accompanying drawings in which:

FIG. 19 is a left side view of the mobile product showroom shown in FIG. 16;

FIG. 20 is a right side view of the mobile product showroom shown in FIG. 16;

FIG. 25 is a left side view of the mobile product showroom shown in FIG. 22;

FIG. 26 is a right side view of the mobile product showroom shown in FIG. 22.

Like reference numerals refer to like parts throughout the several views of the drawings.

DETAILED DESCRIPTION OF THE PREFERRED EMBODIMENTS

Figure 1:
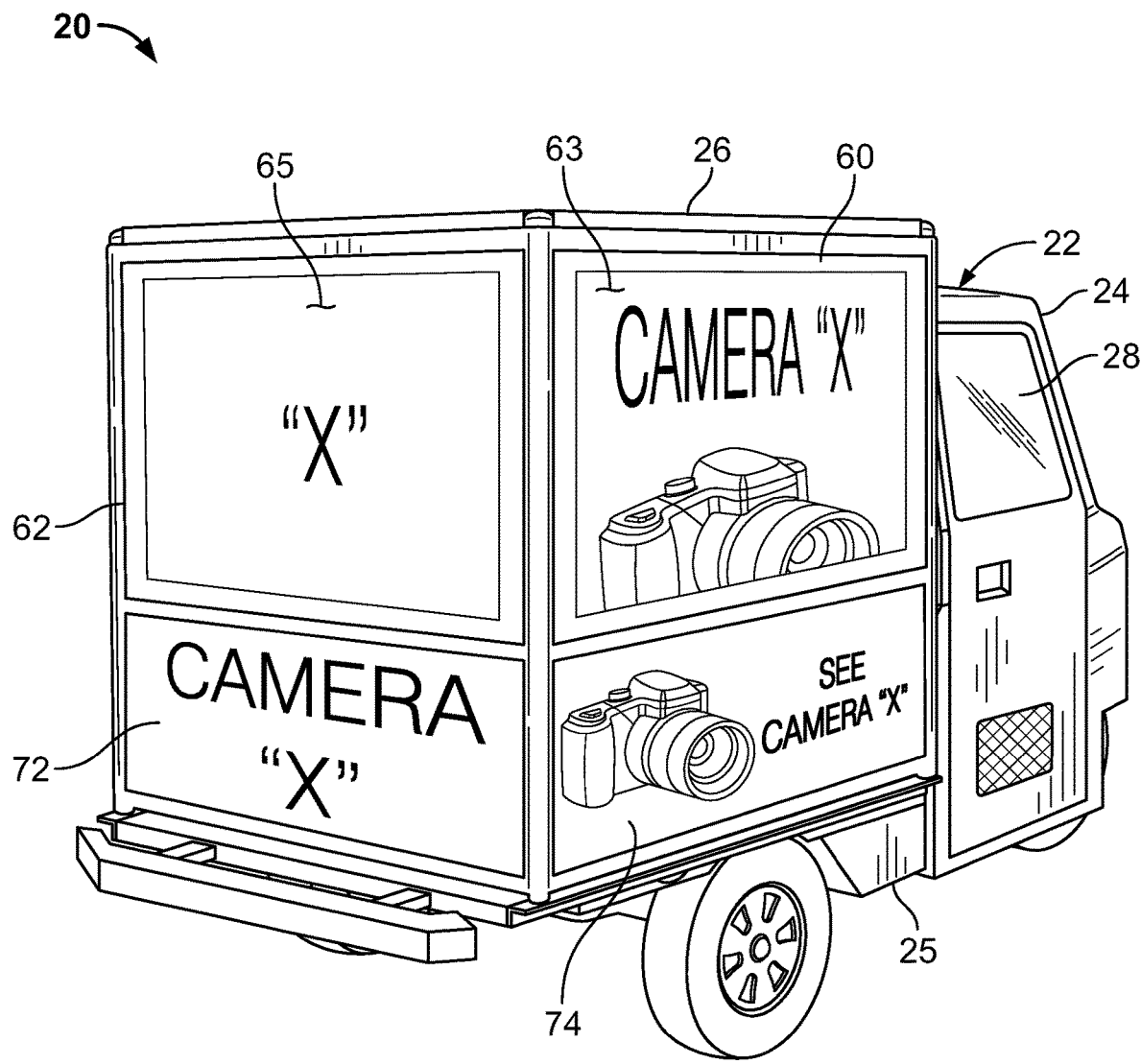
FIG. 1 is a perspective view of a mobile product showroom embodying the present invention, wherein the mobile showroom is configured for transport to a sales location.

For purposes of description herein, the terms "upper", "lower", "left", "rear", "right", "front", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
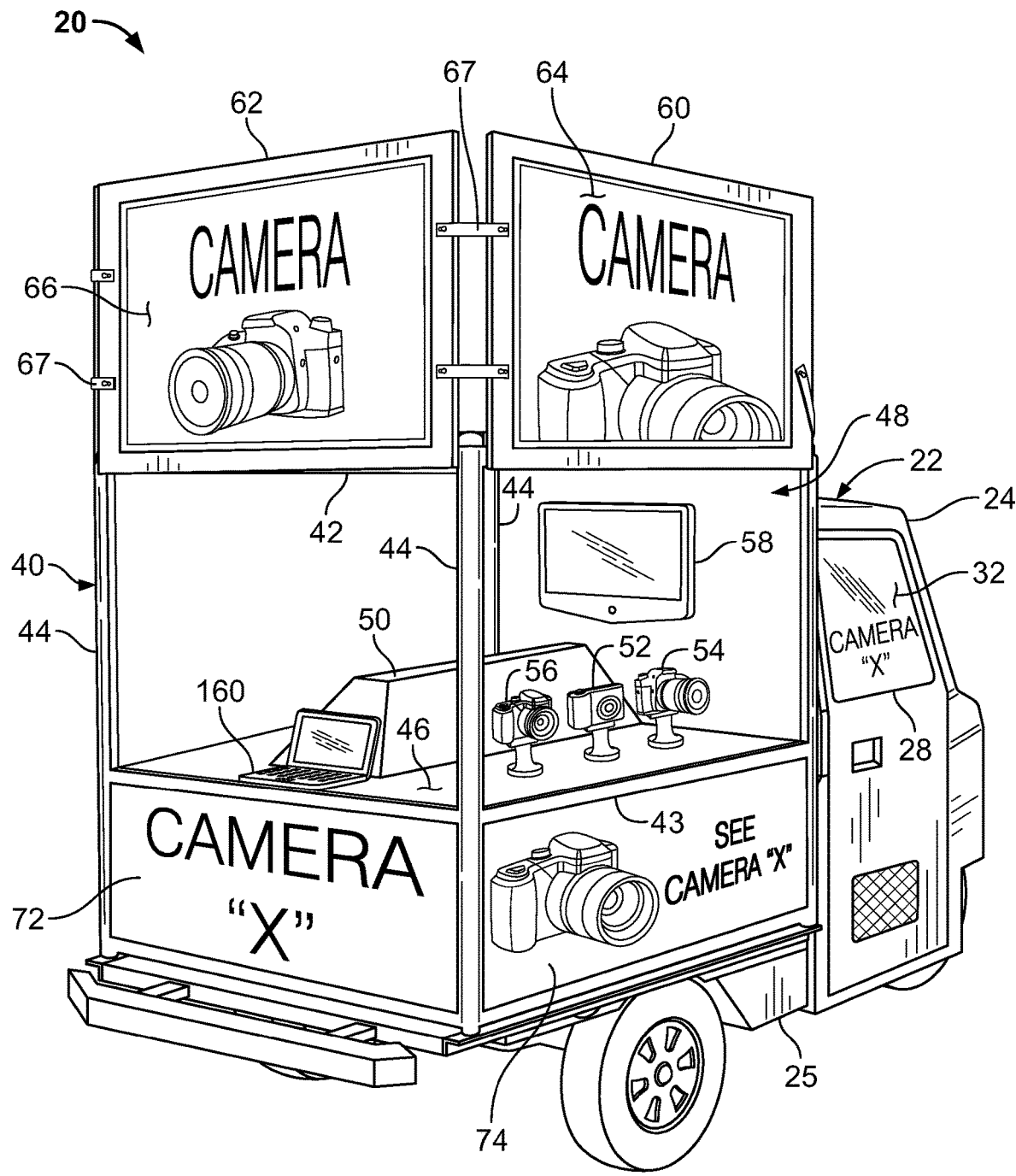
FIG. 2 is a rear perspective view of the mobile product showroom of FIG. 1 configured for displaying a product.
Figure 3:
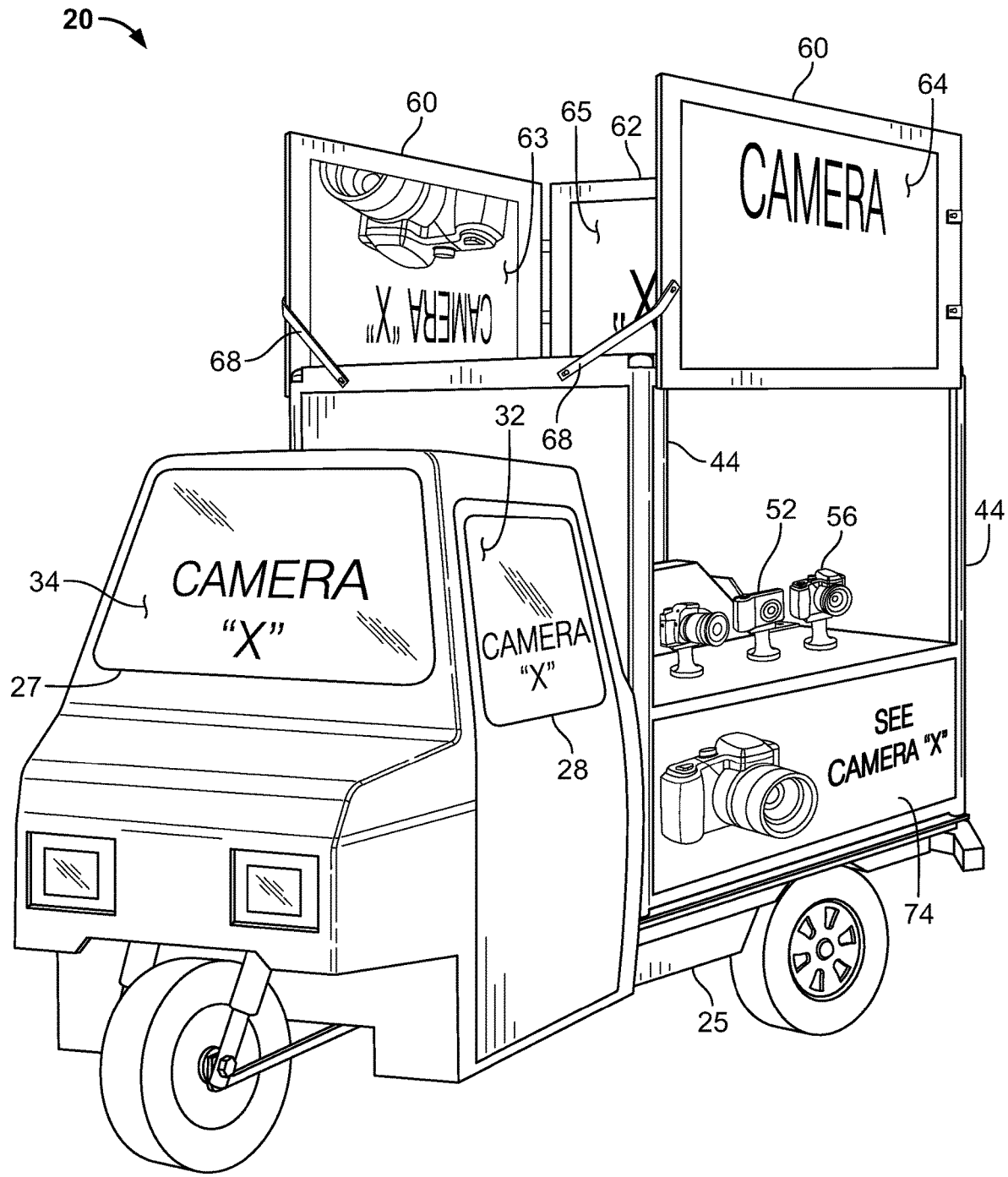
FIG. 3 is a front perspective view of the configured mobile showroom shown in FIG. 2.
Figure 4:
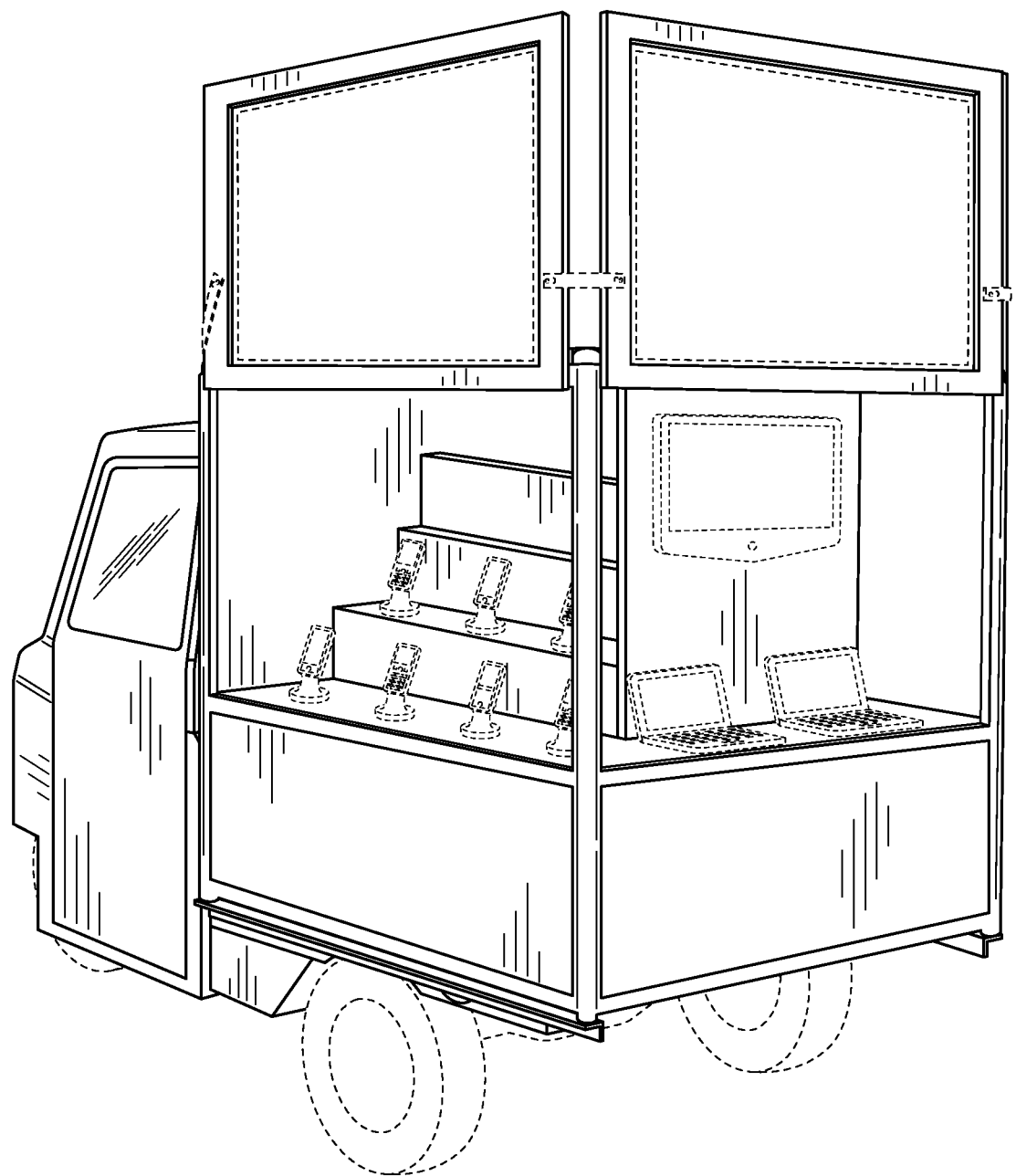
FIG. 4 is a rear perspective view of the mobile product showroom of FIG. 1 configured for displaying a product alternative to that shown in FIG. 2.
Figure 6:
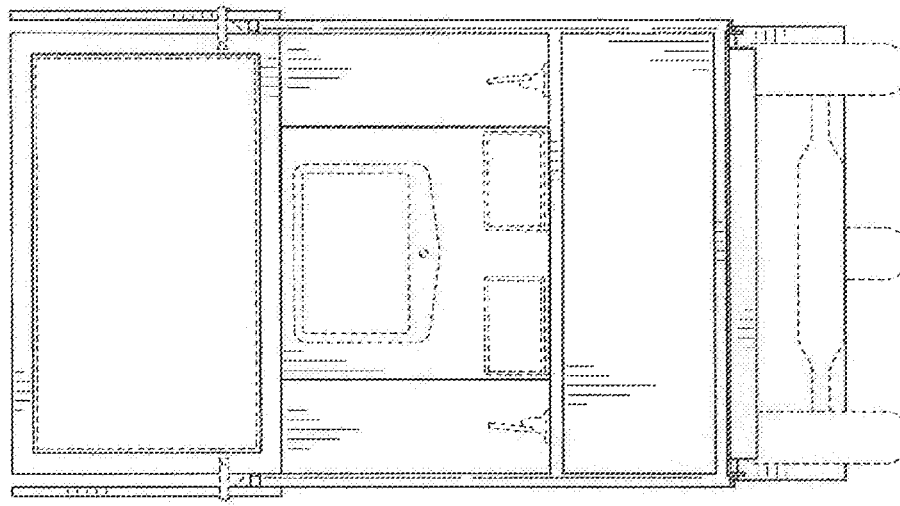
FIG. 6 is a rear view of the mobile product showroom shown in FIG. 4.
Figure 5:
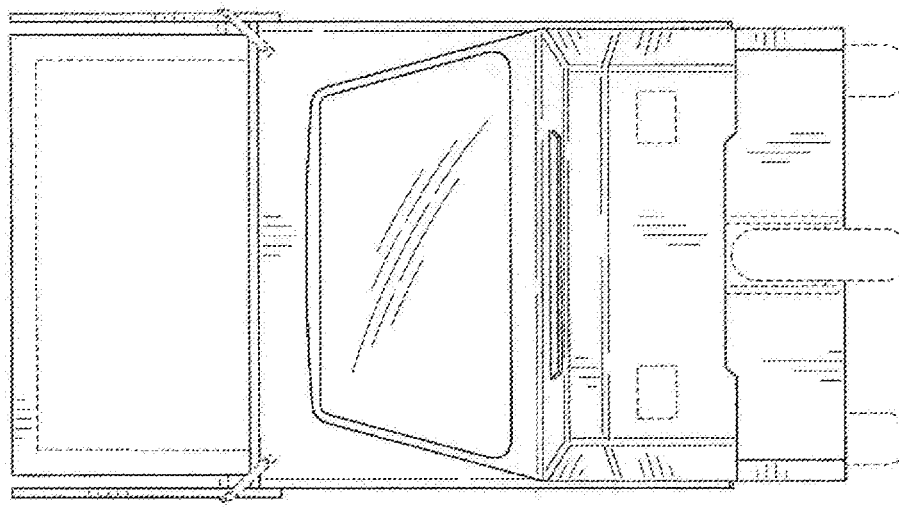
FIG. 5 is a front view of the mobile product showroom shown in FIG. 4.
Figure 7:
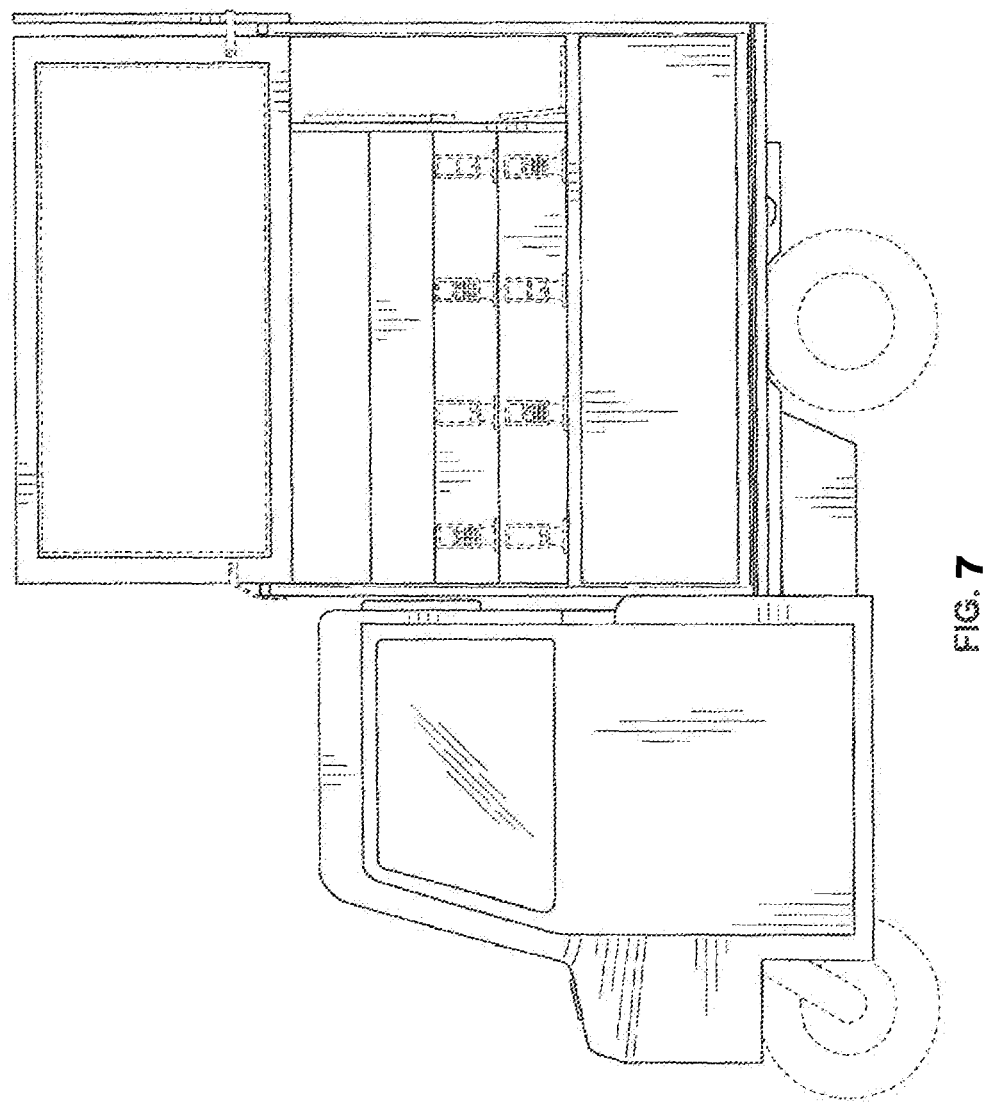
FIG. 7 is a left side view of the mobile product showroom shown in FIG. 4.
Figure 8:
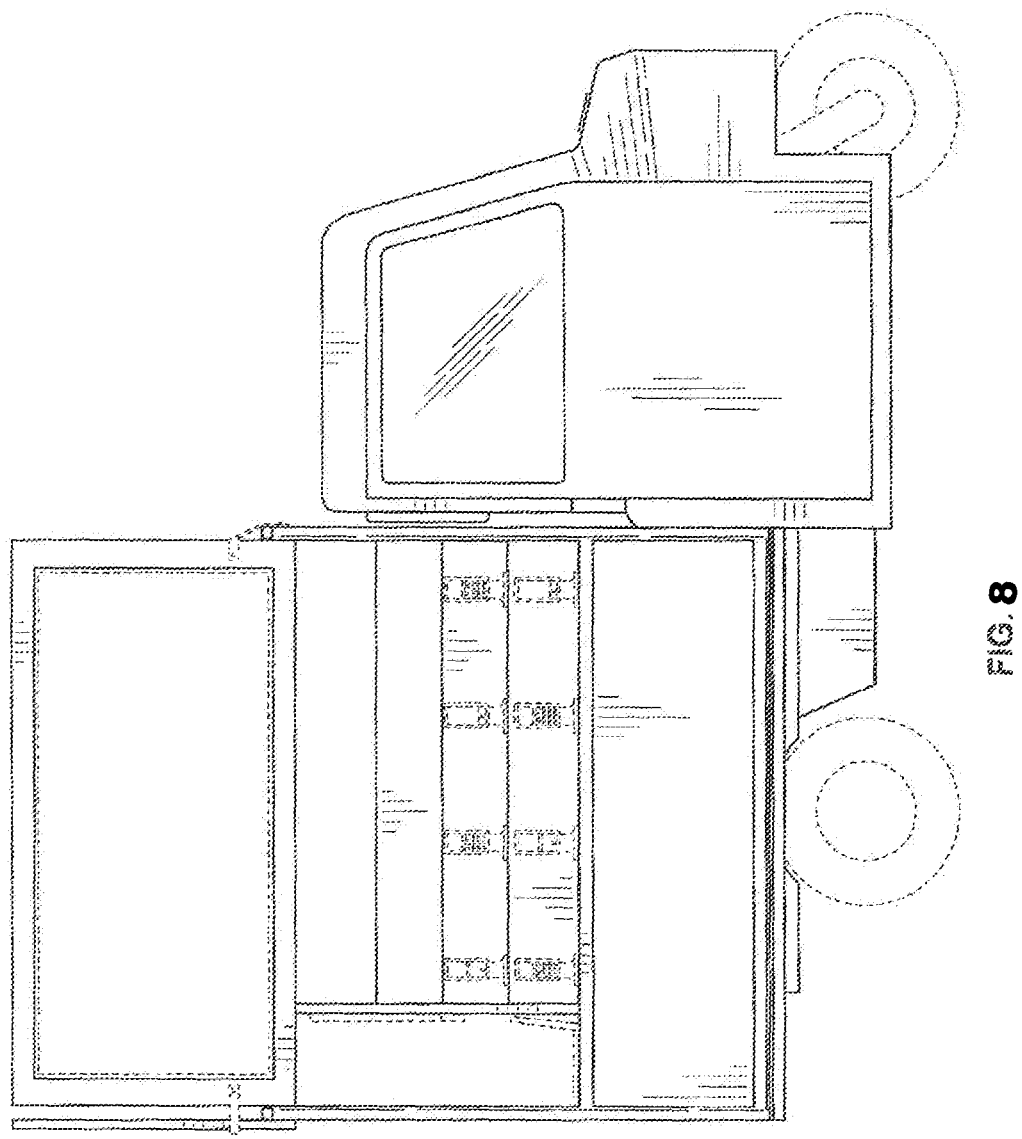
FIG. 8 is a right side view of the mobile product showroom shown in FIG. 4.
Figure 9:
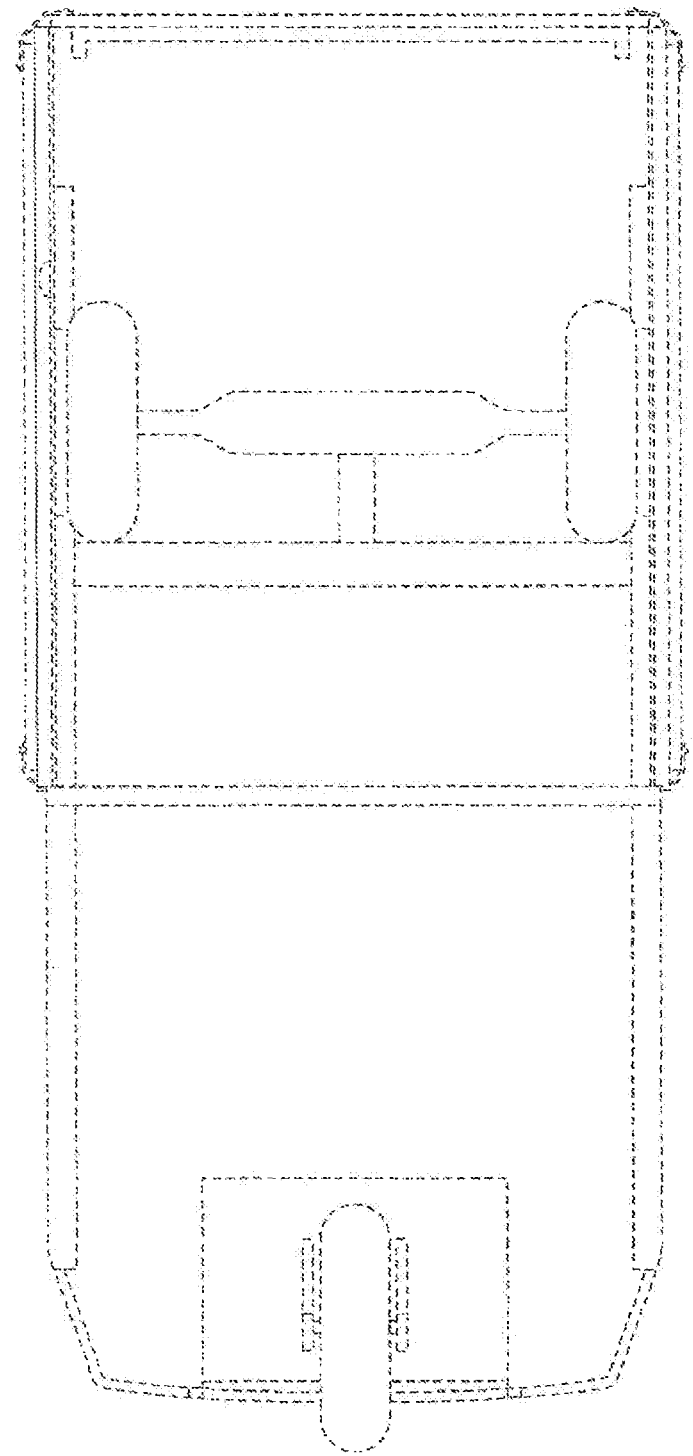
FIG. 9 is a bottom view of the mobile product showroom shown in FIG. 4.
Figure 10:
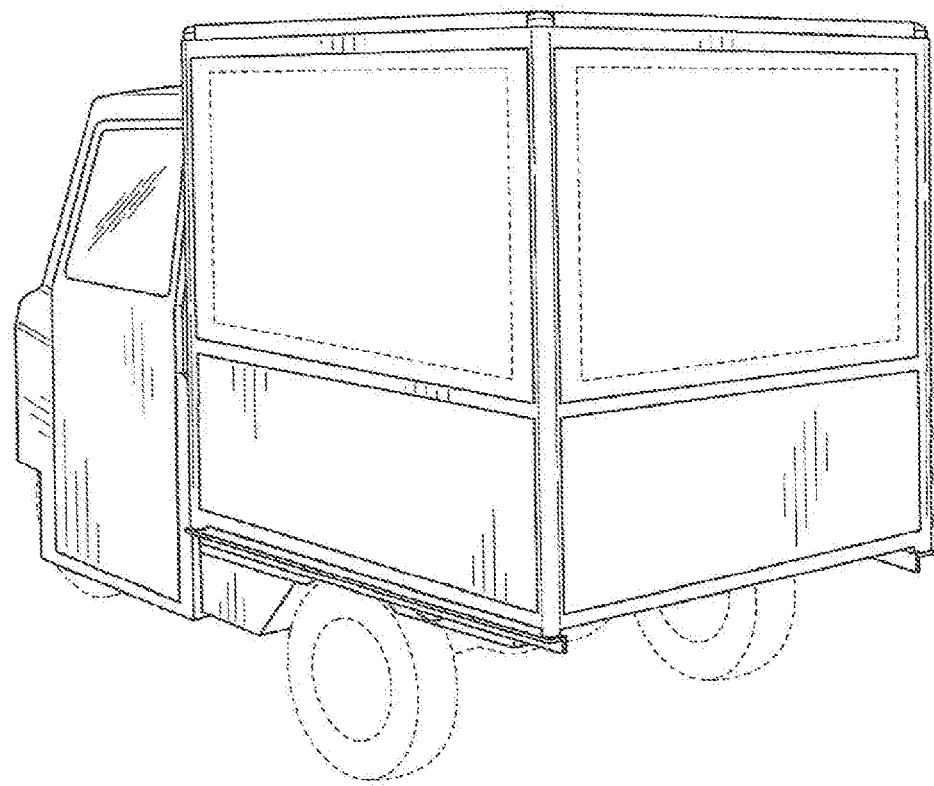
FIG. 10 is a rear perspective view of the mobile product showroom of FIG. 1, wherein the mobile showroom is configured for transport to a sales location and does not exhibit external advertising.
Figure 12:
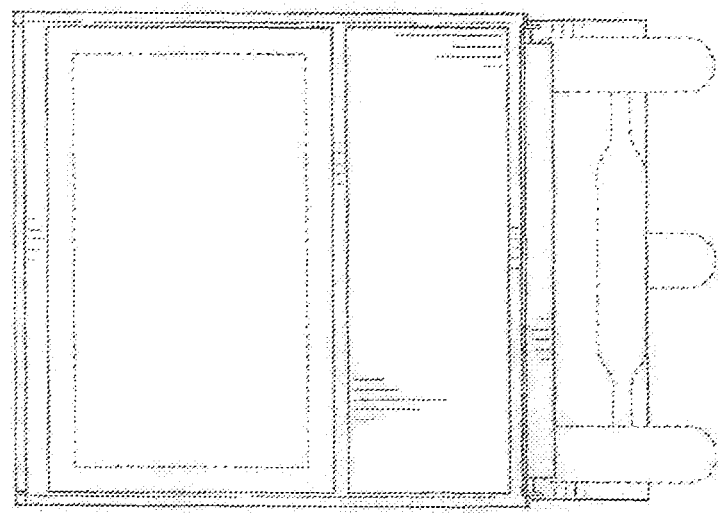
FIG. 12 is a rear view of the mobile product showroom shown in FIG. 10.
Figure 11:
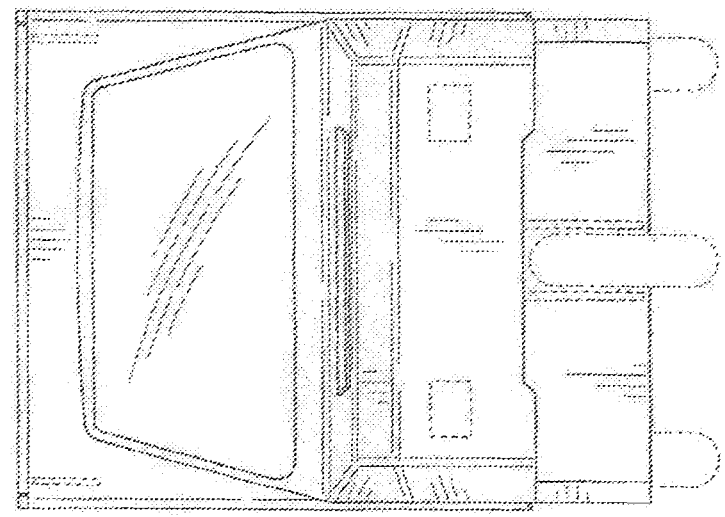
FIG. 11 is a front view of the mobile product showroom shown in FIG. 10.
Figure 13:
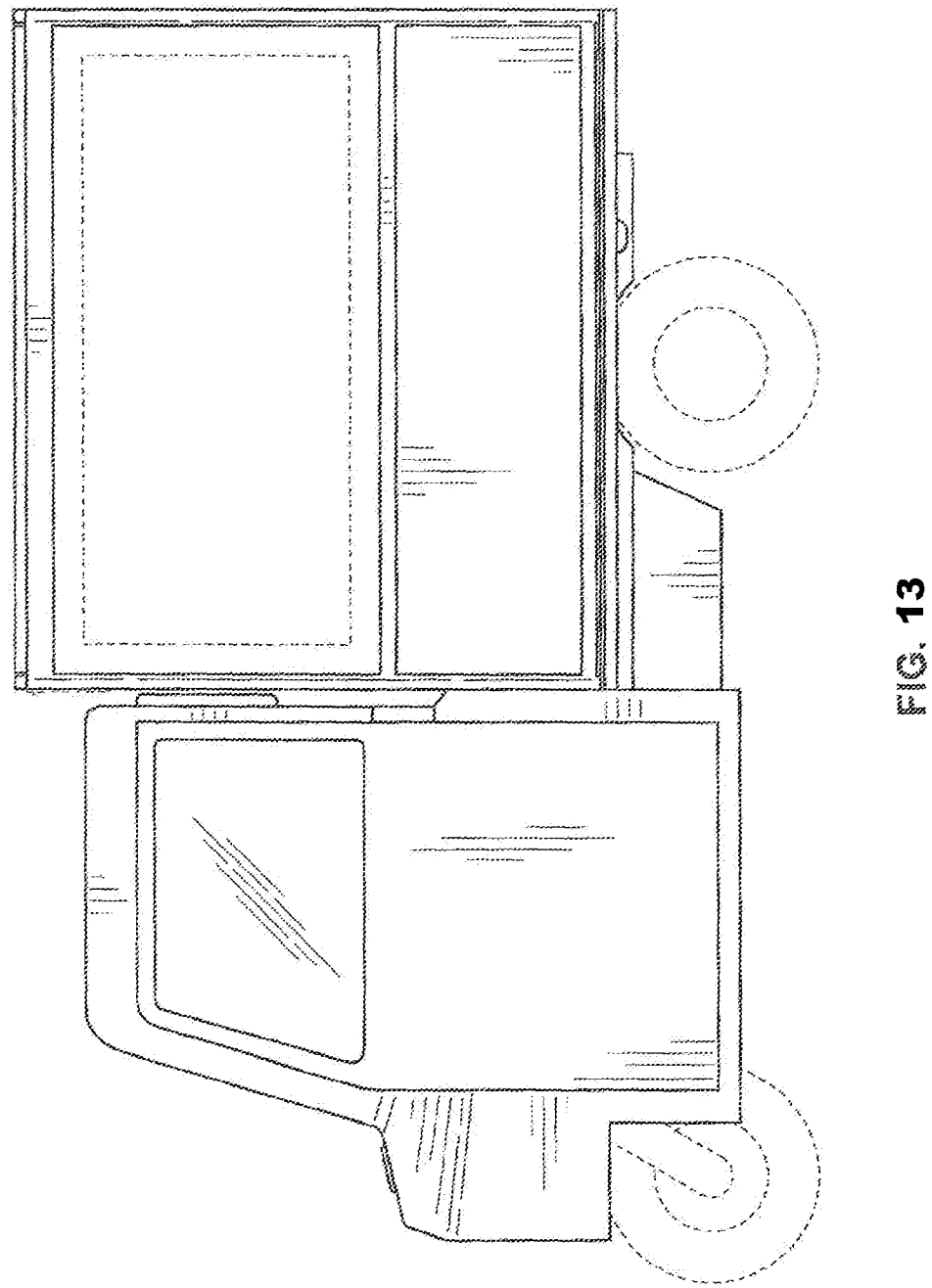
FIG. 13 is a left side view of the mobile product showroom shown in FIG. 10.
Figure 14:
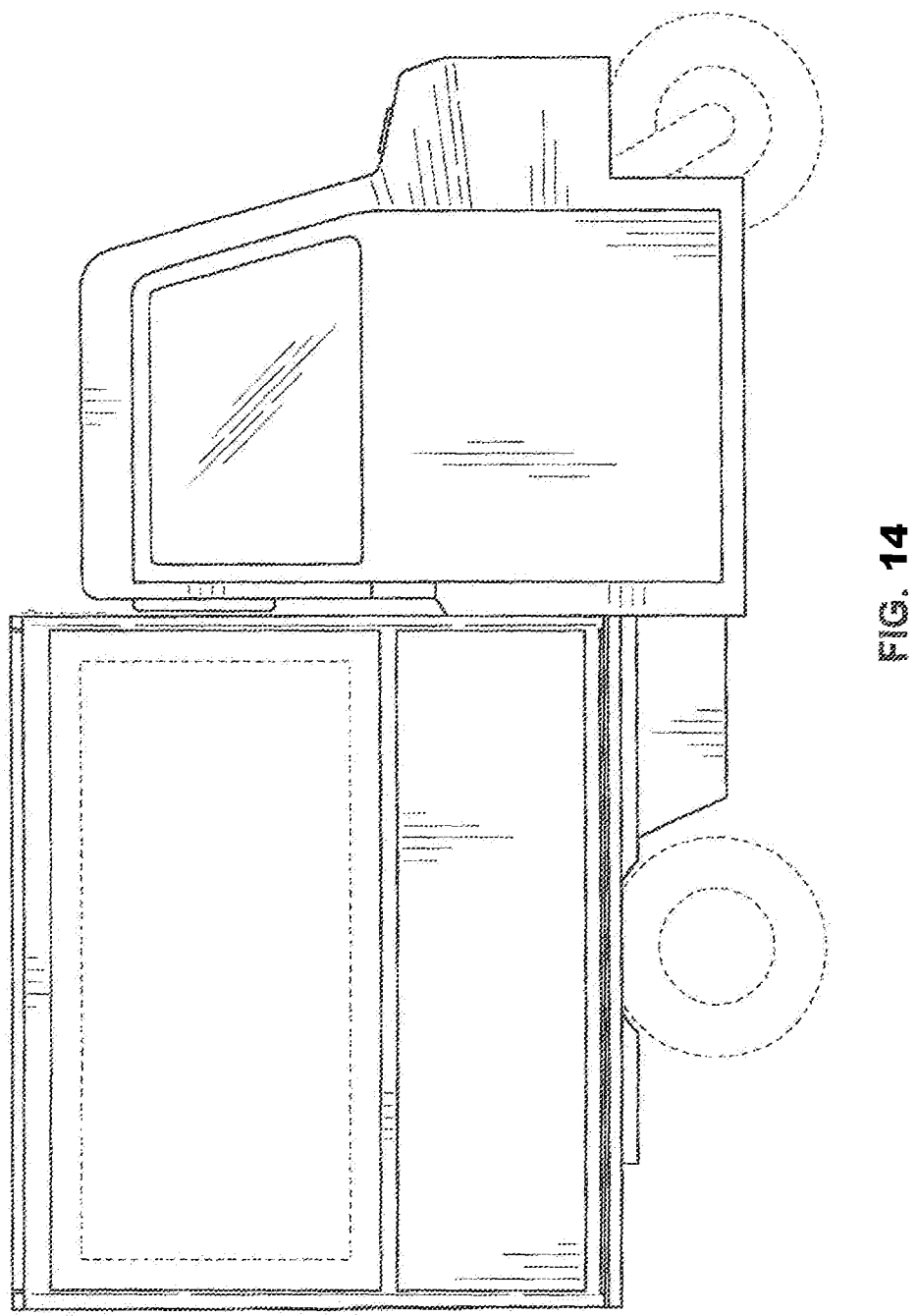
FIG. 14 is a right side view of the mobile product showroom shown in FIG. 10.
Figure 15:
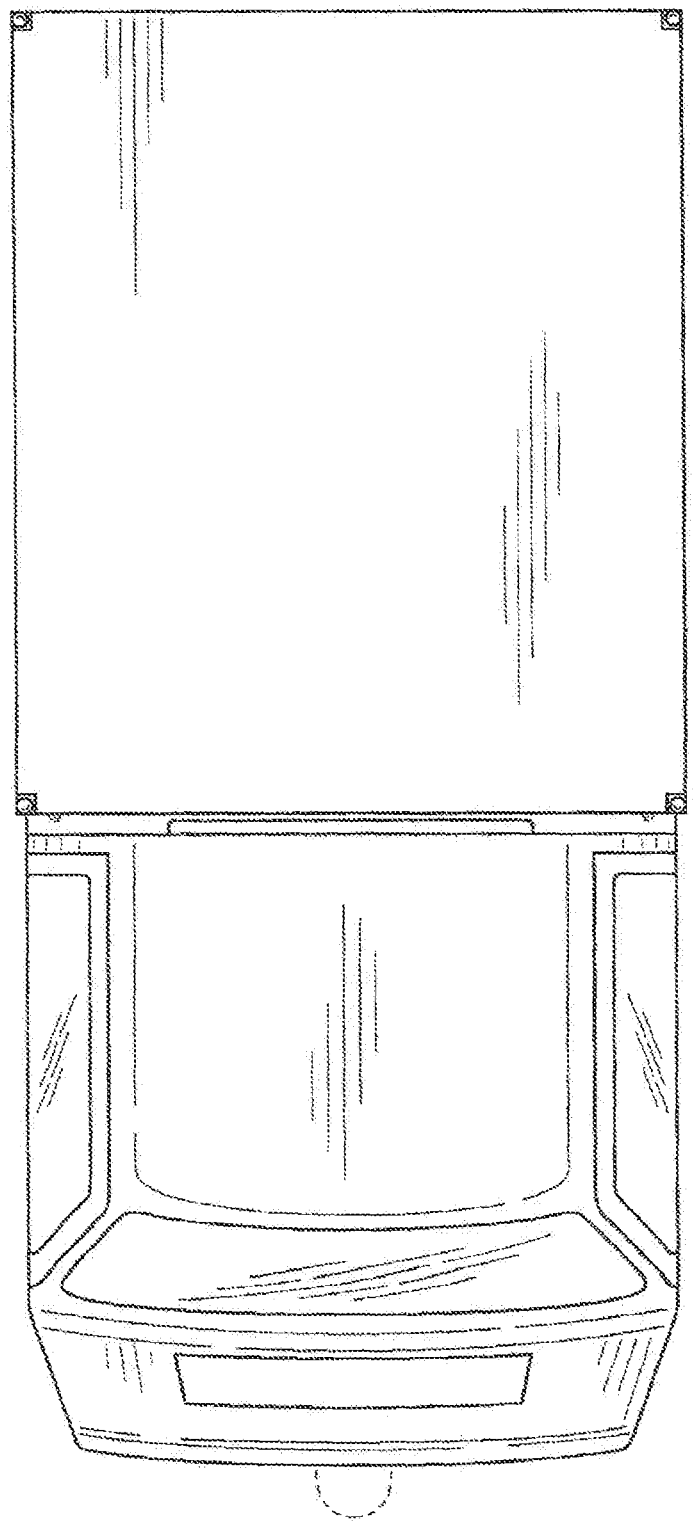
FIG. 15 is a top view of the mobile product showroom shown in FIG. 10.
Figure 16:
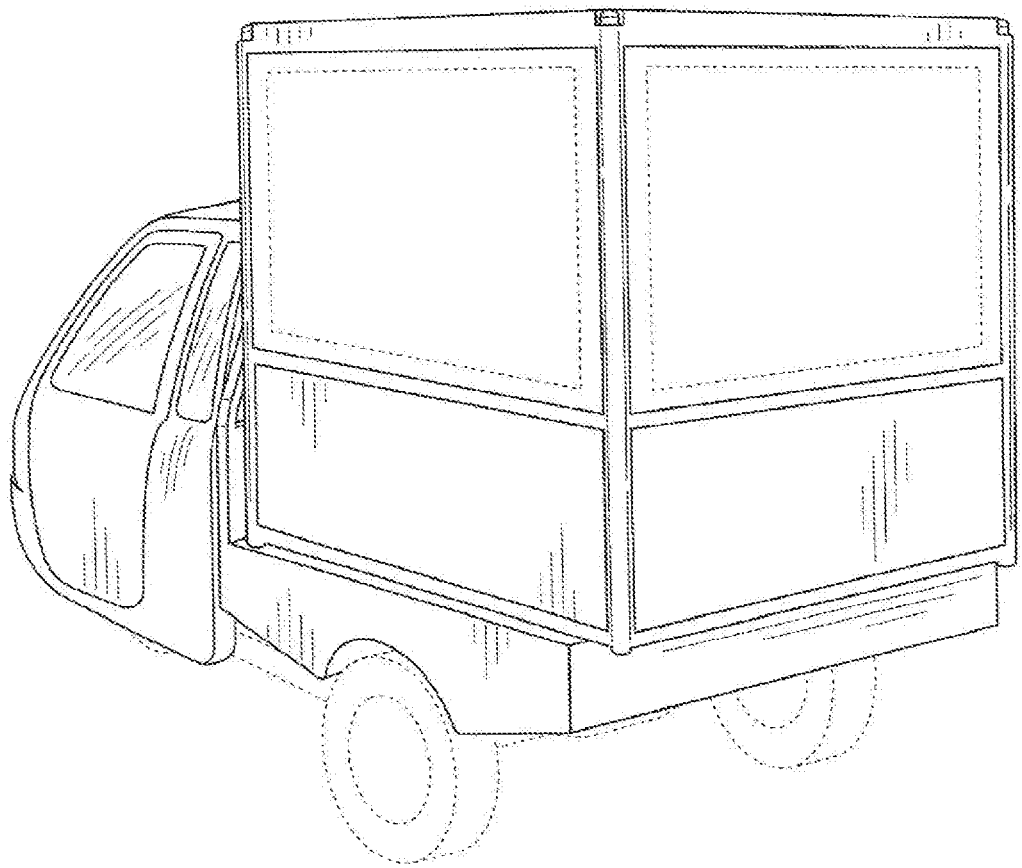
FIG. 16 is a rear perspective view of a further configuration of a mobile product showroom embodying the present invention, wherein the mobile showroom is configured for transport to a sales location.
Figure 18:
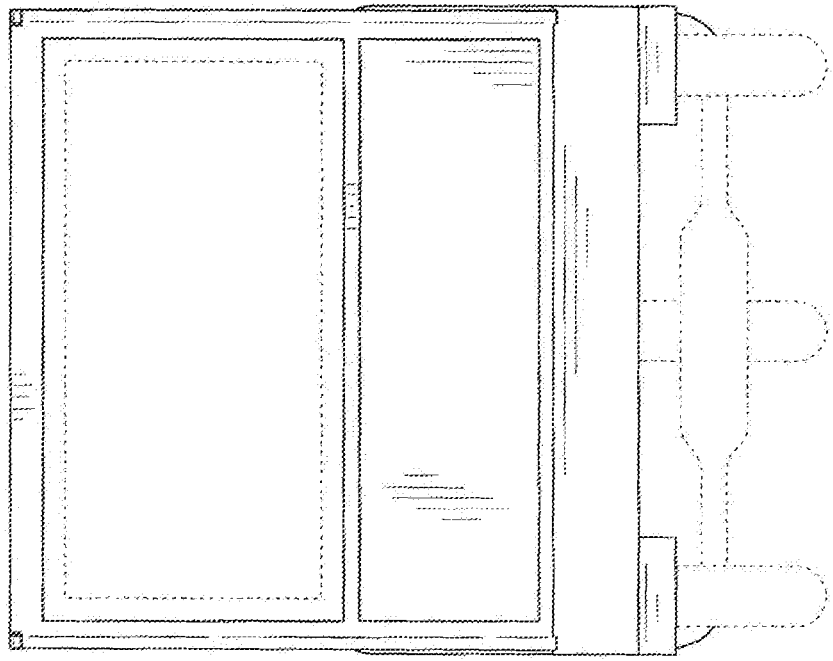
FIG. 18 is a rear view of the mobile product showroom shown in FIG. 16.
Figure 17:
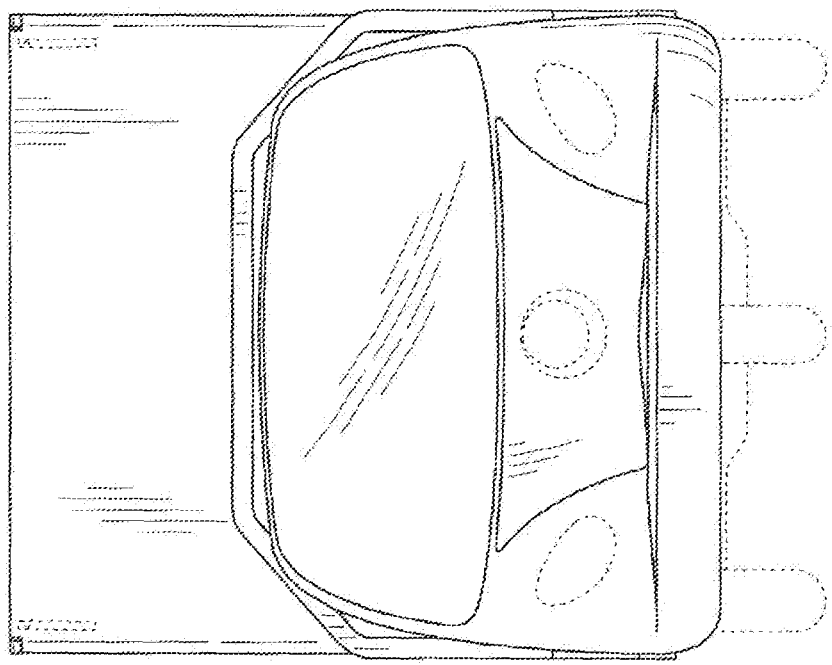
FIG. 17 is a front view of the mobile product showroom shown in FIG. 16.
Figure 21:
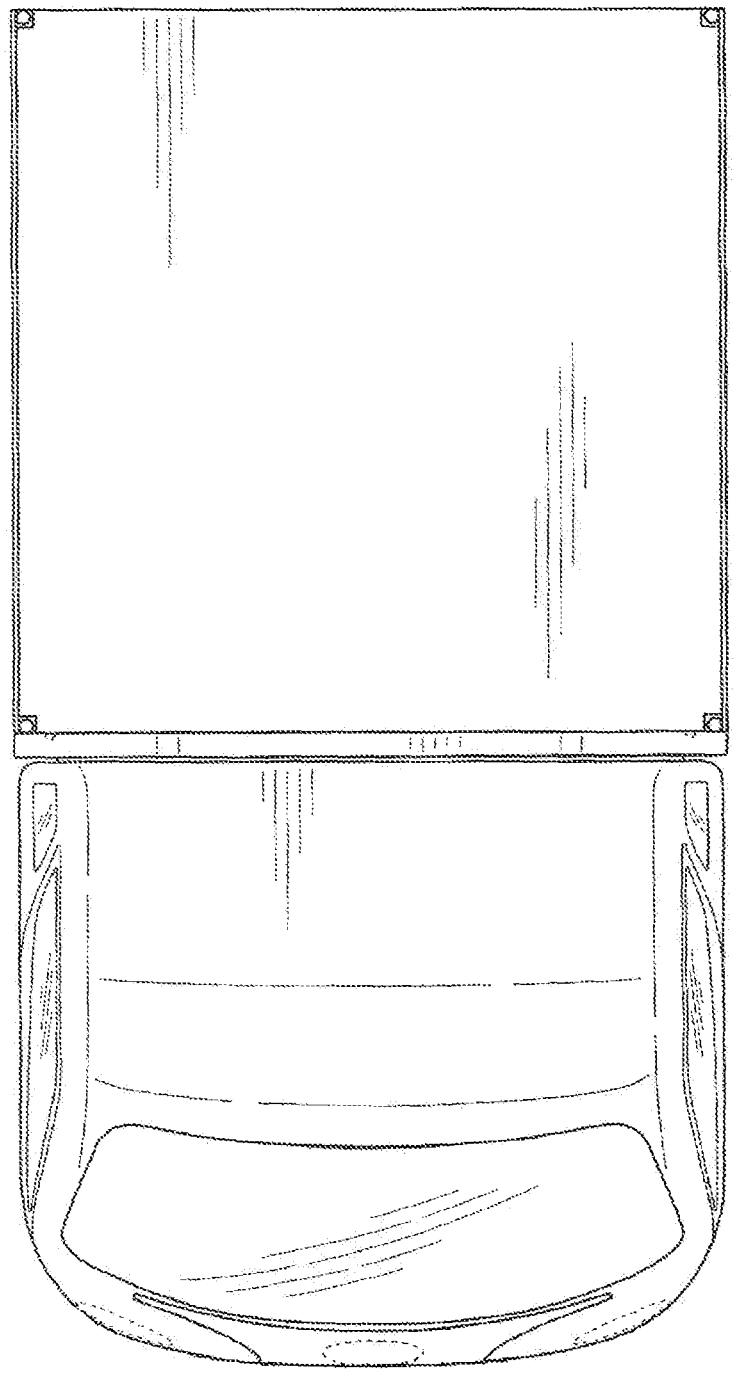
FIG. 21 is a top view of the mobile product showroom shown in FIG. 16.
Figure 22:
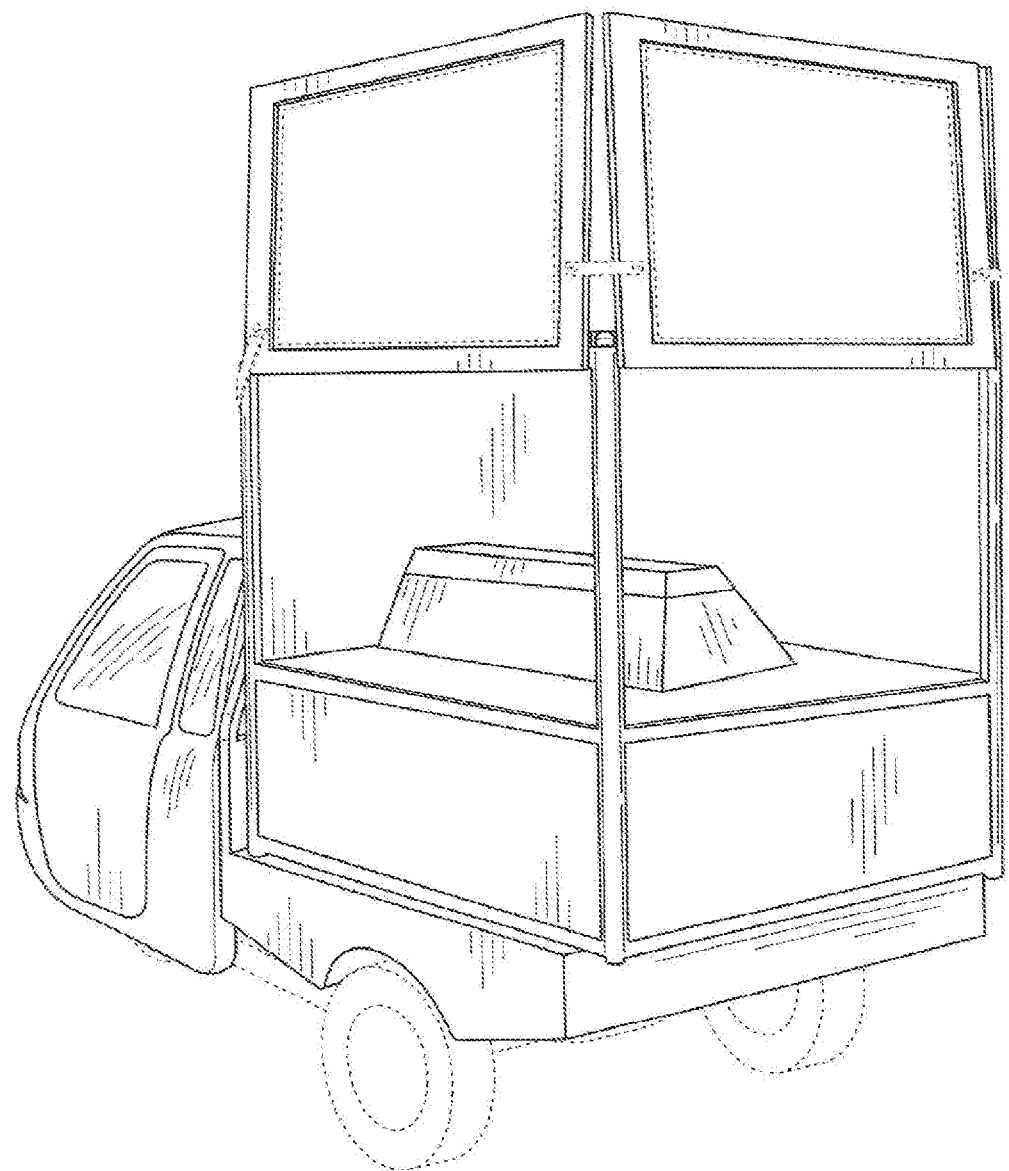
FIG. 22 is a rear perspective view of the mobile product showroom of FIG. 16 configured for displaying a product.
Figure 24:
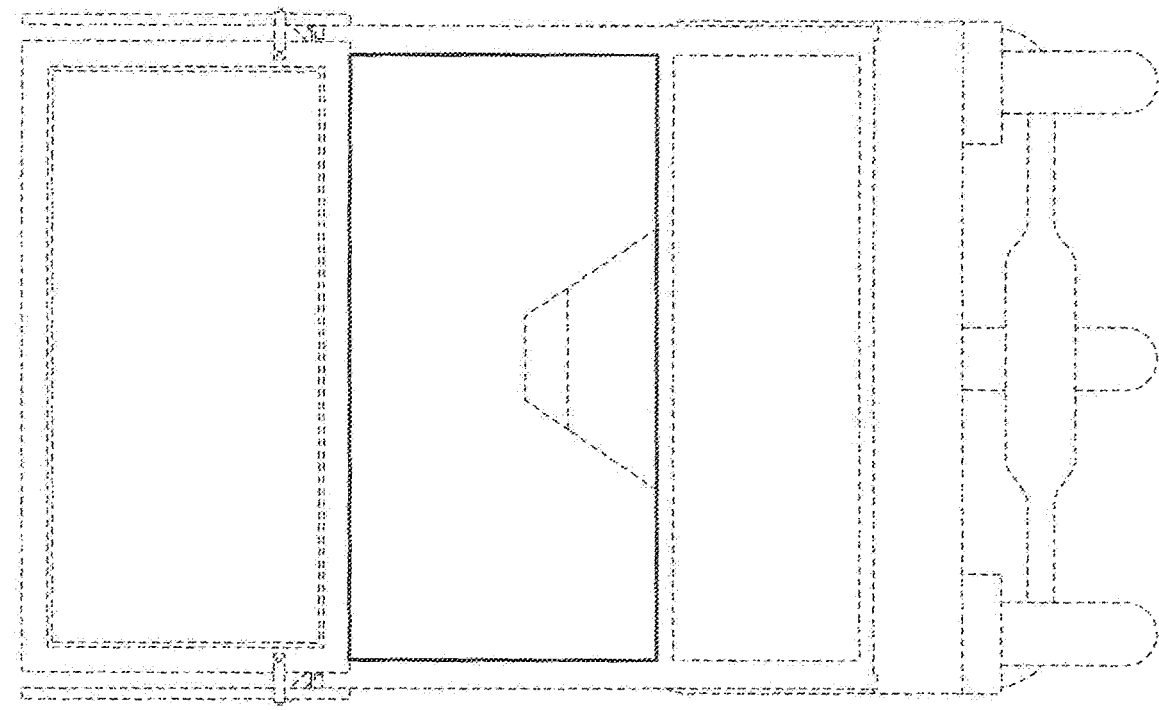
FIG. 24 is a rear view of the mobile product showroom shown in FIG. 22.
Figure 23:
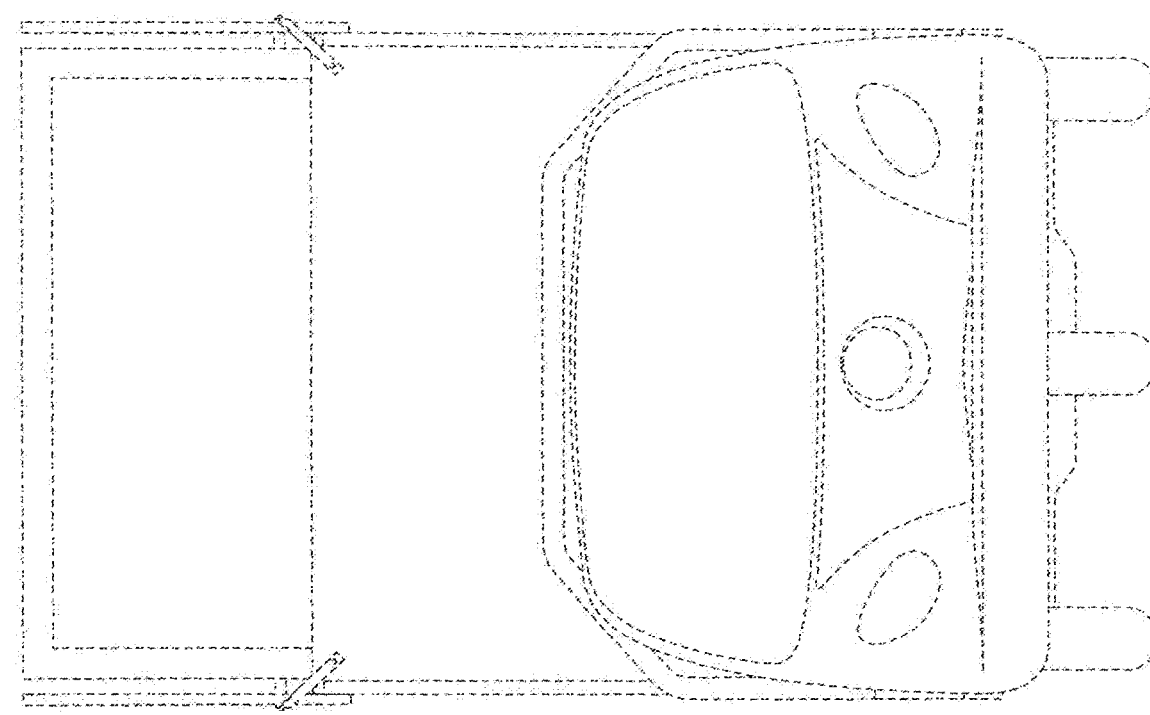
FIG. 23 is a front view of the mobile product showroom shown in FIG. 22.
Figure 27:
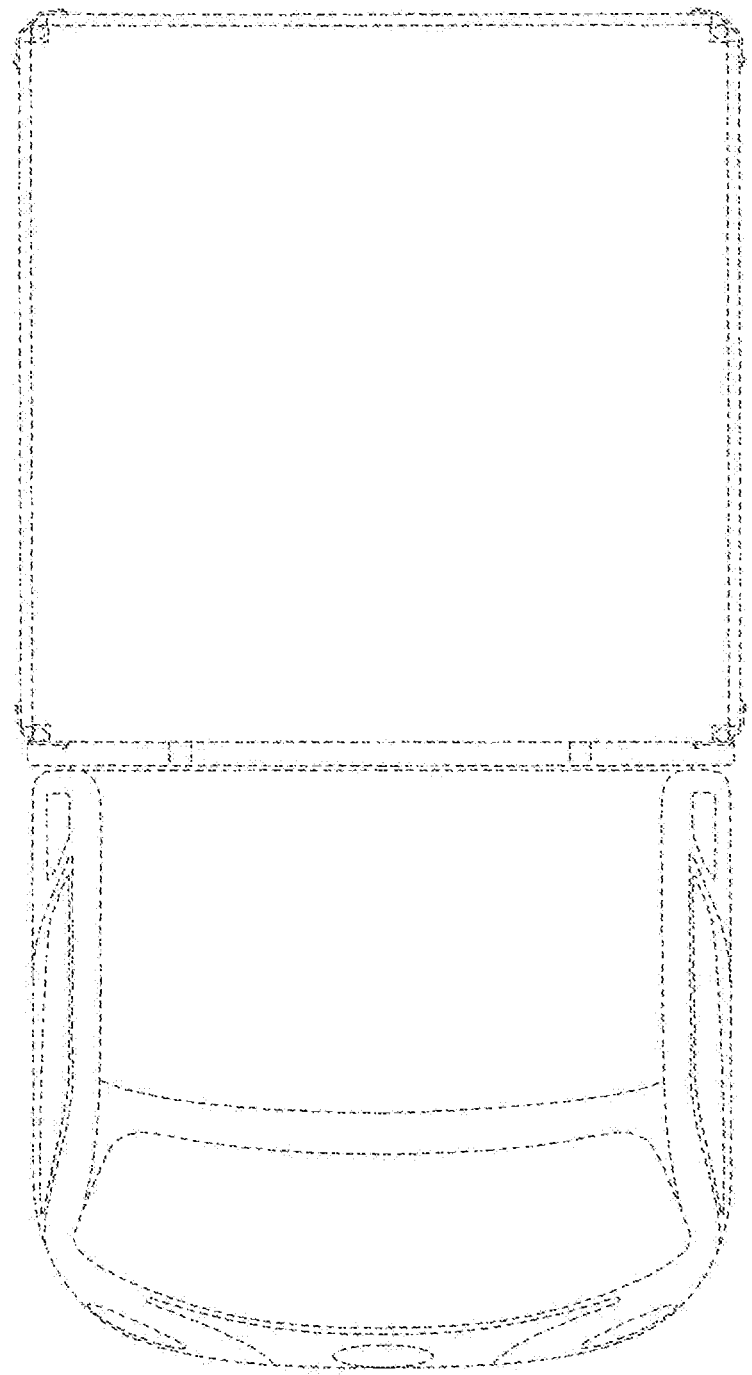
FIG. 27 is a top view of the mobile product showroom shown in FIG. 22.

Turning to the drawings, FIGS. 1-3 illustrate a mobile product showroom 20 for advertising, promoting, marketing and selling goods, and its various components. In one preferred embodiment, the goods are consumer electronics. In an alternate or additional preferred embodiment, the goods are portable ones (whether consumer electronics or otherwise). However, any other product or service can be sold consistent with the invention. Various examples of suitable products and services (which are provided for exemplary purposes, but are not intended as limitations on the scope of the invention), are provided below.

The mobile product showroom 20 is configured from a small self-propelled vehicle 22 that includes a cab 24 for a user to drive the showroom between various locations and a showroom 26 provided behind that cab. In the preferred embodiment, vehicle 22 is typically much smaller than a truck or automobile and more closely resembles a three-wheeled motorcycle with a cab 24 or a golf-cart type vehicle. In one preferred embodiment, the length of the present vehicle is less than fifteen or less than twelve feet, and the width of the vehicle is less than six or less than five feet, and the height of the vehicle is less than seven feet or six or less feet. In a further preferred embodiment, the vehicle has a length of eleven feet, a width of 4.5 feet, and a height of six feet. Thus, the vehicle is smaller than Sprinter type vehicles (sold under the Mercedes Benz, Dodge and Freightliner brands), which can range, for example, from 196 to 263 inches in length (16.3 to 21.9 feet), 74.0 to 78.3 inches (6.2 to 6.5 feet) in length, 93.1 to 104.0 inches in height (7.8 to 8.7 feet). It is also smaller than trailers which can measure thirty feet in length by eight feet in width by eight feet in height, and in various models can range from twenty feet in length to fifty-three feet in length.

Vehicle 22 is readily commercially available and can be three-wheeled as shown in FIGS. 1-3 or can be of a more common four-wheeled configuration. In alternative embodiments, any other desired number of wheels can be utilized. Vehicle 22 can be gas powered, electrically powered with a battery, or can be a hybrid of gas and electric. Cab 24 is of a size to typically accommodate only one or two occupants.

The use of this design allows provision of a moving sales and promotion kiosk which is compact, maneuverable, and highly mobile, which is highly advantageous. For example, the compact size of the vehicle allows it to be parked for demonstration, promotional, advertising, and sales purposes in urban markets without requiring special permits. Likewise, the small size is also highly maneuverable. Furthermore, the embodiment is also eco-friendly, utilizing far less gas than larger vehicles. In this manner, a moving kiosk can efficiently be provided which has demonstration items and/or videos which can be easily transported from place to place.

As shown in FIG. 1, cab 24 of vehicle 22 can include windshield 27 and side windows 28. When the mobile showroom 20 is being transported between static locations, windshield 27 and 28 are free of obstructions thereby permitting the driver to see the surrounding area, street, and traffic. However, when mobile showroom 20 is parked in a static location for operation as a showroom, product placard 34 can be inserted in the windshield and product placards 32 can be inserted in the side windows 28. Placards 32, 34 can include advertisement information regarding the product being shown and sold at mobile showroom 20. Thus, the cab 24 also functions as an advertising medium when the mobile showroom 20 is in a static condition.

The rear portion of vehicle 22 has mounted thereon a product showroom 26. Product showroom 26 comprises a frame 40 including a lower frame 43 which encloses the lower body 25 of vehicle 22, an upper frame 42 supported by vertical members 44, and a roof 38. Frame 40 in combination with display platform 46 and lower frame 43 defines an internal show or display area 48 as illustrated in FIGS. 2-3. Display platform 46 is configured for displaying products or literature therein, and can be of any desired design, including any particular shape and topography suitable for the application at hand. For example, the display platform can be horizontal or essentially horizontal, and/or or can include recesses and/or mounts for securing products thereto. Lower frame 43 can further define an enclosed storage area for promotional supplies such as pamphlets and for product inventory of items intended to be sold on-site.

In the preferred embodiment, as shown in the figures, this platform is open to the air on three sides. The open air design allows consumers to place their arms and hands into the internal show area to experience the touch and feel of the products therein, and to try them out for a literally "hands-on" experience. Thus, consumers and potential purchasers can reach in to the vehicle from the rear, left and right sides to hold, view and experiment with the products on the platform, and to obtain a very direct impression of those products' appearance, weight, features, functions, and so forth.

The three-sided open design further allows consumers to gather around the vehicle and showroom from a large range of angles. Consumers can congregate to watch other consumers or salespeople, whether on their own side or other sides of the vehicles demonstrating or trying the products thereon. The open air and compact design also allows them to reach in to touch and feel products on their own side or other sides of the platform.

Alternatively, a system with less or more sides, or a non-open air system can be used, e.g. in conjunction with other features of the invention disclosed herein. Such systems are generally not preferred, however, as they lack numerous of the advantages of the preferred embodiments.

Show area 48 can also include therein an optional display background 50 supported on display platform 46 to provide an eye appealing background for the display of the various product samples 52, 54, 56 supported on display platform 46 for display to the public. Show area 48 can also include a video display 58 such as an LCD television mounted for displaying product promotional information for consumer education. Such information can include product use instructions, unique product features, or product demonstrations. The information on the video display can relate to the product samples 52, 54, 56 placed on display platform 46 and/or to other products and services such as upcoming new technologies.

Show area 48 can further include a computer terminal 60 such as a notebook computer that includes the capability for wireless connection to the Internet. Computer terminal 60 can be used for a variety of purposes including ordering the product for a customer from a participating store for the customer to either pick up or for home delivery. The terminal can also be used to provide limited time discount coupons for individual customers which they must use within a short time prior to expiration of the discount. Thus, an individually tailored discount can be provided based on the needs and desires of the customer and the sales agent at mobile showroom 20.

Lower frame 43 typically includes rear and side panels 72, 74 respectively to aid in enclosing the lower body 25 of vehicle 22. Panels 72, 74 can be configured to accept product advertisement panels to appeal to the public. Panels 72, 74 are preferably visible at all times whether vehicle 22 is moving or static.

Upper frame 40 has affixed thereto right and left side movable panels 60 and rear movable panel 62 respectively. Preferably, each panel is separately movable from the other panels of the vehicle. In one embodiment, panels 60, 62 are hinged at the top edges of upper frame 44 to swing or flip up from a lowered to a vertically raised position. Alternatively, the panels can be mounted on slides to translate within a vertical plane from a lowered position to a raised position by sliding up and down along a track.

When in their lowered or closed position, movable panels 60, 62 enclose show area 48, as illustrated in FIG. 1, thereby facilitating the transport of mobile product showroom 20 from one locale to the next and to protect the product samples 52, 54, 56 displayed therein. When lowered, panels 60, 62 fixedly latch to lower frame 43. Movable panels 60, 62 also accommodate outer product advertisement panels 63, 65 respectively. When panels 60 are lowered and secured advertisement panels 63 are oriented so the viewing public can read the content of panels 63.

Movable panels 60, 62 also include inner product advertisement panels 64, 66. Advertisement panels 64, 66 are oriented such that when movable panels 60, 62 are in a raised position, panels 64, 66 extend above upper frame 42 and above the showroom to face outwardly from mobile showroom 20. They are thus readable by prospective customers and viewable from greater distances.

Preferably, in their raised position, panels 60 and 62 extend above roof 38. When these panels extend vertically above roof 38, they can serve as a vertical billboard above and around at least three sides of the showroom. As a result, advertising is provided above the mobile showroom that can be read at a distance. In this manner, the raised panels and advertisements thereon are located above the consumers congregating around the vehicle and showroom such that those consumers do not block view of the advertisements on the panels. Thus, other passers-by drawn to a crowd of consumers around the vehicle can tell what is being demonstrated from the panels located above the heads of that crowd.

In one embodiment, panels 60, 62 in their raised position are restrained and connected one to the other at adjoining edges by retention straps 67, and the front edges of side panels 60 are supported in their raised position by braces 68 (FIG. 3). Alternatively, in the embodiment wherein the panels slide up vertically, they can be secured to the frames they are attached to.

Any wording, images or so forth can be placed on the front and back sides of the panels as desired, allowing the fronts and backs of the panels to serve as billboards. In a preferred embodiment, advertisements are placed on each of the billboards of the vehicle. The advertisements can all be the same, or can all be different, or some of the advertisements can be the same (duplicative), with some being different from the others. Thus, the rear side, the left side, the right side, and the front side of the showroom and vehicle can all have the same billboard, or different billboards, or some duplication, as desired.

Furthermore, as shown in the figures, each of the panels can potentially be viewed from both sides. The panels each have a front side which is visible at all times, but also have a back side which becomes visible when the panel is raised. In other words, the front side is visible to observers when the panel is raised or lowered, with the back side of the panel being visible when the panels are raised, but not being visible to observers when all of the panels are lowered (due to the fact that the back side faces the platform for product display). The same advertisement can be placed on the front side and the back side, or different advertisements can be placed on them. Any combination of advertisements on the billboards of the four sides of the vehicle and the fronts and backs of those billboards can be utilized that is desired.

In accordance with a preferred embodiment of the invention, the raising of the billboards provides additional advertisement space and visibility over traditional signs placed on a vehicle. For example, when the panels are in the raised position, the advertisements on the rear billboard and the advertisements on the right and left side billboards are all visible from the front of the vehicle. In other words, the back side of the rear billboard, and the back side of the right and left side billboards are all visible from in front of the vehicle when those panels are raised. Likewise, the advertisement on the right side's billboard is visible from the left side of the vehicle (and from other angles), and the advertisement on the left side's billboard is visible from the right side of the vehicle (and from other angles).

In this manner, at various angles from the front of the vehicle, three or four sides of billboards or advertisements are visible, namely, the advertisement in the front window of the cab, the back side of the rear billboard, the back side of the right billboard, and the back side of the left billboard. Similarly, at other angles, at least three billboards or sides are visible. For example, from the right front of the vehicle, a consumer or potential purchaser can see the front side of the raised right billboard, the lower right billboard (normally concealed when the right panel is lowered), the back side of the raised rear billboard, and the back side of the raised left billboard.

In the embodiment where the panels are hinged, the advertising panels appear inverted from the front of the cab when they are pivoted to their raised position. In a configuration where panels 60, 62 are mounted to vertically slide between a lowered and raised position, the orientation and placement of advertising panels 63-66 is arranged such that advertising panels 63-66 are readable when panels 60, 62 are in both the raised and lowered positions. In either embodiment, when panels 60, 62 are raised and secured they form a "U" shape which is oriented such that the open part of the "U" faces to the front of vehicle 22, thereby permitting viewing of advertising panels 63 and 65 from the front of mobile product showroom 20, and thus providing four quadrant exposure of advertising panels to the purchasing public.

As a result, considerably increased advertising space and signage is available for display to consumers and potential purchasers. Furthermore, advertising is visible from an increased range of angles, with more billboards visible from any potential angle than is common with conventional advertising on moving vehicles.

In use, the operator of the mobile showroom 20 configures the showroom for a particular product by affixing advertising panels 63-66 to panels 60, 62 and by affixing advertising panels 72, 74 to lower frame 43. Products anticipated to be advertised by mobile showroom 20 include, but are not limited to: cellular telephones, including smart phones; cameras, including digital cameras, camcorders, and video cameras; global positioning systems (GPS); computers, including notebook computers; personal digital assistants (PDAs), video game units and video games; music and video players, such as satellite radios, car stereos, mp3 players, portable video players, and personal CD/DVD players; television sets, including flat panel televisions; and electronics and computer accessories. It will be understood, however, that this list is not exhaustive, but rather, any consumer electronics device, or any other product or service can be used in conjunction with the present invention.

The applicable window placards 32, 34 are selected and stored for later use. Show area 48 is populated with product samples 52, 54, 56 for display to the public. The desired pre-recorded product promotional videos are loaded for subsequent play on video display 58, and the desired product files and Internet connections for notebook computer 60 are stored on memory within computer 60. The operator then powers vehicle 22 and drives to the desired area in which the mobile showroom 20 is to be set up for display. Because of the small size of mobile showroom 20, the areas available include curbside or even on a large sidewalk, pedestrian courtyards, and common areas of indoor and outdoor malls. The small size of mobile showroom 20 facilitates taking the product display to highly trafficked pedestrian areas thereby insuring significant exposure of the product to the public. In this manner, the mobile showroom 20 can be taken to the customer rather than the showroom being in a fixed location and waiting for a customer to enter.

Once the desired location for mobile showroom has been reached, the operator stops vehicle 22 and secures it in position by setting brakes, blocking wheels, and whatever other precautions may be necessary for the safety of those visiting mobile showroom 20. The operator then places placards 32, 34 in the windows 27, 28 of the vehicle cab 24. Next, panels 60, 62 are pivoted to their raised vertical positions and secured with retention straps 67 and braces 68. The product samples are then placed on display platform 46 and secured in place. Video display 58 is powered on to begin displaying product videos, and computer 60 is booted to aid the operator/sales person with product ordering and discount coupon features. The operator remains in the location for the desired time demonstrating the product, answering questions, assisting customers in ordering product, or even in selling quantities of product stored in inventory in lower frame 43. Upon completion of the desired sales/demonstration period, the operator secures mobile showroom 20 by reversing the above described steps and then driving to a new location whereupon the process is repeated.

Thus, the present mobile showroom, can easily move through all high traffic environments, making it easier to deliver a close, eye-level, one-to-one, one-to-many personal encounter that appears more intimate and user friendly. These showrooms offer the brand marketer the ability to establish the preferred daily routing, times of day or evening in each market, to effectively reach out and communicate the product message to a specific target audience. The showrooms give brand marketers total flexibility to drive and deliver intercept sampling, live product demos, education and information, target market couponing, market research, mobile wireless SMS and download messaging, and many other forms of interruptive media engagements to deliver a measurable "hands-on" impression. Furthermore, the showroom can be provided as a fully turnkey packaged program, from the initial ideation, to drawings and fabrication, to qualified and experienced staffing, local route planning, e/o and accident insurance, progressive field reports, and seasoned account management. The showrooms are particularly useful as they attract instant attention, all types of attention, from the media, the target consumer, the non-expecting onlooker, and even a party's competitors. The showroom is very approachable, highly friendly, highly interactive and fun to experience. And most important, it is not obtrusive to any public or private sector. The showrooms are also easy to understand and enjoy, which leads the showroom consumer engaging his or her friends about the product and/or service they just encountered.

The showrooms can be used in conjunction with any type of goods or services. Some examples follow:

Electronic Retailers and Personal Electronic Retailing (PER)

There are, on average, over 1,000 products and services to choose from in any Consumer Electronic Retailer emporium. This is both daunting and most confusing to the purchaser, especially when there is more than one brand that has a strong presence both inside and outside the store. Moreover, since there is more than one consumer electronics store to make a purchase, the ability to reach out and engage the consumer to help them make a buying decision, even before they walk into the store, gives such a retailer a distinct advantage over its competitors.

In this manner, the mobile showroom of the present invention, is an ideal means to showcase a brand category direct to the consumer outside of the store, crafted to provide a retailer with a means to take the lead in showcasing its product and services, or to showcase a particular manufacturer's products and services which are sold in a plurality of retailers.

With the showroom, the proper stage can be set to experience all of the product attributes in a particular category. If the company is in gaming, for example, then the top five to ten titles can be put on display and played to show consumers all of the key features. Tied into another retail partner, the hardware that is used to play the game can bring about the one-two connection that it takes the hardware to play the software. Or, if the gaming title is meant only for play on a PC through a broadband Internet connection, then three partners can work together to reach out to the consumer. In general, the mobile showroom offers a multitude of options and means to increase the consumer's connection to the brands that the store is featuring on, and/or the products that the manufacturer is promoting, at any given time.

Numerous PER Services can be provided, including, but not limited to, product display/trial; "sponsorship" opportunities; data capture; literature handout; one on one education; use of Internet Enabled Laptops; purchase of products in real time; credit card terminals; sweepstakes entries; cause tie-ins; texting campaigns; Bluetooth downloads; looping content via mounted flat screens; and so forth.

Broadcast & Cable Stations/Watch Entertainment (WE)

With over 500 programming channels available on the average cable TV or satellite TV set top box, it is no wonder that the average number of TV channels that a typical TV Household will program on a regular basis is no more than twelve. Yet, they have 30 times that number at their fingertips for their choosing. Some of the programming they will find by "surfing" the menu listing, or by being told by a friend that a particular show, series or movie, is a "must see" program that needs to be recorded with their DVR. Sometimes if they are in the mood or have quality down time on their hands, they will turn on the "tube" to watch a particular program that simply happens on impulse.

In accordance with the invention, the mobile showroom can be used to help the viewer see programming that they might not have heard about, and/or to direct them where to find it. It can be used to help the local cable affiliate, the national broadcast channel, the national pay TV services, and so forth, reach out to the cable TV or satellite viewer and help them to find entertainment, sports, education, information, and other programming that they probably were not even aware existed, as well as expose them to programming that they might have been aware of but had never watched.

Thus, the mobile showroom can be used to get the viewer educated about and connected to programming where they live, work or play. The Internet is there to help reinforce the programming efforts, but the real "push" to get the viewers' attention is to go to them, show them, and invite them to experience the programming on a particular service. The mobile showroom WE services can include, but are not limited to: multiple flat screen viewing; data capture; use of Internet-enabled laptops; TV timetable handouts; Bluetooth downloads (e.g. of program clips); texting campaigns; cause tie-ins; and so forth.

Cosmetics & Fragrance Sales/Make Over Stations (MOS)

The mobile showroom of the invention can be used to assist the female consumer in staying connected with the latest and newest cosmetic and fragrance offerings coming to a retail or online store front. The showrooms are ideal to smartly, creatively, and intuitively interact with all types of potential female customers, offering the cosmetic and fragrance brand marketer the ability to "experience in person" what is "hot" and what is not. It also allows the marketer the ability to put its brand front and center in all types of new selling environments in which female customers can experience a real live makeover, showing them how to do their eyes, lips, cheeks, nails—all things "cosmetic" come to life in the most stylistic way imaginable. The movable showroom can be used to deliver anything from beauty buzz "tried and true" make over tips, to very minimal base line essentials. It can further deliver the brand marketer message, the product offer, and the direction on where to make a brand purchase by showcasing the full line of beauty products to anyone, anywhere in the US.

The mobile showroom MOS services can include, but are not limited to: product sampling—makeover stations; data capture; literature handout; one on one education; use of Internet-enabled laptops; credit card terminals; sweepstakes entries; cause tie-ins; texting campaign; delivery of personalized results; and looping content via mounted flat screen.

Mobile Banking/Friendly Banking Services (FBS)

Trust, honesty, integrity and easy-to-follow solutions are what banking customers prefer in today's more challenged economic environment. The credibility with some of America's biggest banking institutions has clearly made a case for banks to have more friendly and engaging dialogue and interaction with their local banking customers. The ability to reach out and speak to them in any number of ways with a more "human" exchange is a major advance of the mobile showroom of the present invention, designed to offer both large and small banks the ability to bring back "personalization", putting a more friendly and meaningful face on their bank's branding communication.

The mobile showroom is a means to "press-the-flesh" with both current and new customers, while at the same time offering them each a way to discover new and friendly services. Everyone appreciates the ability for online banking to save time while removing frustration to either waiting in line for a bank teller or not being able to capture quick answers to some annoying questions. In this manner, the mobile showroom delivers a highly personal and extremely user-friendly engagement tool which smartly demonstrates that the bank clearly has its customers' best interests at heart.

The mobile showroom FBS services, can include, but are not limited to: data capture; literature handout; new account application; one on one education; use of Internet-enabled laptops; sweepstakes entries; cause tie-ins; texting campaigns; Bluetooth downloads; looping content via mounted flat screens; and so forth.

Insurance/My Insurance Now (MIN)

To walk out the door today, and even for the door you walk out of, you need insurance. It is one of the biggest expenses that individuals and businesses have to accept. There is a need for health insurance, auto insurance, single dwelling (condo/apartment/single family) insurance, and if one has children, probably school loan insurance. In some cases, there is a need for boat, motorcycle, or aircraft insurance. Likewise, for those who travel a great deal, travel insurance is generally a must. Last, but not least, individuals must have life insurance if they are the key household provider.

All told, it can easily require a minimum of three and up to ten insurance policies to get through life fully protected. For many, there is also retirement insurance to know they will have a roof over their head, which has become one of the newest insurance policies being offered in case one of the consumer's other policies expires when he or she reaches the age of 65 years.

The mobile showroom is an excellent means to give the prospective consumer a very hands on explanation and understanding as to what an insurance policy is, how and why one needs a policy or policies, and through this communication exchange, provides the insurance company the means to offer all of the key policies that one must understand and eventually subscribe to at a cost-affordable rate.

The mobile showroom provides the insurance company's direct contact with people who would like to have more information, more access to understanding what policies they need, what they don't need, and a friendly and reliable source to know that if they work with the company, they will get exactly what they need and must have in their daily lives. The showroom allows the company to communicate the proper message to the proper consumers so that the connection is real and direct with no misunderstanding as to what and how it is being provided.

The mobile showroom MIN Services can include, but are not limited to: data capture; literature handout; new account application; one on one education; use of Internet-enabled laptops; sweepstakes entries; cause tie-in; texting campaign; Bluetooth downloads; looping content via mounted flat screens; and so forth.

Real Estate/2nd Home or Timeshare (2HOT)

The media and the financial markets continue to relay the fact that the housing industry is in its worst slump in many years. The overbuilding of condos and single family homes has put a real strain on those who own their homes, and those who appear unqualified to capture a loan to buy their first dwelling. Yet, there are still many home buyers and current home owners, those who have the disposable income, who are now looking at this distressed market and think it is the ideal time to buy a second "vacation home", or can see the second home as an investment for themselves or someone in their family.

As a result, the mobile showroom can be used to reach out to: people who would like to learn more about their options for buying a new home/condo; those looking to build more equity because of the real estate market today; those who are for the first time seeking a timeshare in a popular vacation market; and those deciding whether it is the ideal time to purchase a retirement property.

The mobile showroom offers the smart real estate builder, the hotel time share company, and others the ability to smartly reach out to those prospective buyers who may not think that they are in the market to make a new home or timeshare purchase, but who, upon seeing and learning about the right opportunity, can be persuaded to do so.

The showroom engages prospective buyers in ways that are not traditional, showing them what is available, how attractive the property is, and how attractive the price point is. Through the mobile and direct contact with the consumer it offers a very friendly and persuasive atmosphere that truly makes the seller's communication effort extremely buyer friendly.

The mobile showroom 2HOT services can include, but are not limited to: data capture; literature handout; time share application/prequalification; one-on-one virtual tour; Internet-enabled laptop; sweepstakes entries; cause tie-in; texting campaign; Bluetooth downloads; credit card terminals; property replica build out; and looping content via mounted flat screen, among others.

Cruise Lines/Sail the High Seas (SHS)

In America, approximately one-third of the US population has experienced a luxury cruise line vacation. Leisure travel for all ages generally includes going with special friends or the larger family on the high seas in a luxury cruise liner. The freedom to just pack only once, enjoy wining and dining at any time of the day or night, or just stopping in one or many ports-of-call is an adventure to be remembered (and repeated) in one's lifetime.

The mobile showroom can be used to bring information, pictures, video and a very friendly staff of cruise experts to all types of residential and commercial communities in a most exciting and engaging way. It allows cruise line personnel to go "to" the people who can be encouraged to discover a new adventure, one that fits within anyone's budget. It can be used to show what and how the cruise adventure works, how easy it is to "come on board" to see places, people and experiences not found through a traditional vacation getaway, in a manner all designed to remove the fear-factor that going on a cruise ship is too expensive or too hard to discover the right way to do it.

The mobile showroom SHS services can include, but are not limited to: data capture; literature handout; application for sales representative to follow up; one-on-one virtual tour; Internet-enabled laptop; sweepstakes entries; cause tie-in; texting campaign; Bluetooth downloads; credit card terminal; cruise ship amenities replica build out; and looping content via mounted flat screen, among others.

Travel/Vacations Are Us (VAU)

There are two ways to consider vacation travel. One way is to stay home and drive short distances to areas that you most enjoy and which do not require an overnight stay, or if they do, have very affordable hotel rates. The other way is jump on a plane or a cruise line, and go somewhere exotic that offers a new adventure or has all of the refinements to just relax and enjoy the change of scenery. But the hardest part, in the beginning, is how to plan out this time off, when, how and at what cost.

The mobile showroom is the ideal 'vehicle' to bring the travel message and experience to the consumer in a most fun, stimulating and engaging way. The showroom offers the travel industry, a single brand at any time, the means to showcase their services to help the soon-to-be-vacationer make the right choice on having their travel plans worked out properly in advance of their departure. The real decision-making experience is all about having the knowledge to know what to do, when to do it, and where to do it.

The showroom offers many access points, from hard literature and video destination demos, to experienced travel consultants who answer key questions at the point of contact. All of this is designed to introduce travel services and solutions in a non-intimidating and personal way.

The mobile showroom VAU services can include, but are not limited to: data capture; literature handout; application for sales representative to follow up; one on one destination recommendation; Internet-enabled laptop; sweepstakes entries; cause tie-in; texting campaign; Bluetooth downloads; credit card terminal; cruise ship amenities replica build out; and looping content via mounted flat screen, among others.

Politics/Get Out The Vote (GOTV)

Direct communication is required for political candidates to reach out and touch someone in the most engaging and relevant way. The mobile showroom allows candidates the ability to meet their future supporters in a most trusted and unsuspecting way: providing a means to meet their constituency in all the right places, at any time of the day or night, and to let them know the best candidate of choice.

The mobile showroom allows candidates the ability to bring their message, image, platform, and vision directly to the people where they live, work and play. It also makes communication "real" and "trusted" in a most unusual way, anywhere the message needs to be heard. It enhances and can be used in addition to the old ways of advertising, making phone calls, distributing pamphlets, or now, heavy internet campaigning. It is a valuable part of the overall strategy to win over voters, both those who are sitting on the fence and those who still need to make that formal decision as to who they should vote for in the upcoming election.

The mobile showroom VAU services can include, but are not limited to: live polls; voter registration; opponent infiltration; literature handout; Internet-enabled laptop; texting campaign; loudspeaker announcements; and looping content via mounted flat screen, among others.

Accordingly, the present system allows salespeople to educate consumers as to the use and advantages of their products, and to promote, market, and sell those products on a mobile platform. The vehicle serves as a mobile educational, promotional, marketing and sales center for educating consumers as to the functions and advantages of their products and services, and for promoting, marketing, advertising and selling those products. The vehicle allows a company to bring a showroom with items directly to the consumer in any desired environment, allowing salespeople the ability to easily and efficiently demonstrate and promote those products to consumers in that environment, where the consumers can touch and feel them. New products and services can be easily brought to consumers, and demonstrated in a very "hands-on" fashion, to show them the latest technologies. These products and services can be promoted and demonstrated in nearly any area, including areas where traditional retail stores may not be nearby, such as next to the beach, or by a temporary or permanent event of interest, or in any other area. In general, the vehicle allows for quickly and easily setting up a temporary (or semi-temporary or permanent) kiosk for promotion and sales anywhere a small vehicle can travel and park, which significantly broadens the ability to reach consumers who are potential purchasers. In this manner, the vehicle can be used for increased advertising, marketing, promoting, and selling products and services to consumers.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

What is claimed is:

1. A method, comprising:
(a) using a self-propelled moving vehicle to promote goods and/or services;
(b) wherein the vehicle comprises a cab, and a showroom located behind and attached to the cab;
(c) wherein the showroom comprises a display area, at least a portion of the display area including a display platform being used to display goods and/or services for promotion of the goods and/or services to consumers;

(d) the showroom comprising panels, the panels comprising a left side panel at a left side of the vehicle, a right side panel at a right side of the vehicle, and a rear panel at a rear of the vehicle;

(e) wherein the left side panel, right side panel, and rear panel each has a lowered position and a raised position, and wherein the rear panel has a front surface and a back surface, and wherein advertising is provided on the front surface and the back surface of the rear panel so that the advertising can be seen when the rear panel is in the lowered position and when the rear panel is in the raised position;

(f) wherein the panels surround the showroom on three sides, and, (g) wherein at least one panel is above the display area when the panel is in the raised position, and wherein a consumer can touch the display area on the right side of the vehicle, and can touch the display area on the left side of the vehicle, and can touch the display area on the rear of the vehicle, while the showroom is attached to said cab and while the panel over that side of the vehicle is in the raised position;

(h) wherein the showroom comprises a roof, and wherein the panels each have a top when in the raised position, each of the tops of the panels being above the roof of the showroom when the panels are all in the raised position; and, (i) wherein the advertising is at least partially above the roof of the showroom when the panel is in the raised position, and wherein the advertising promotes the goods and/or services to consumers.

2. A method as claimed in claim 1, wherein the panels bar access to the showroom, when the panels are all in the lowered position.

3. A method as claimed in claim 1, further comprising the step of providing advertising on the front and back of all of the panels, to promote the goods and/or services to consumers whether the panel is in the lowered position or the raised position.

4. A method as claimed in claim 2, further comprising the step of providing advertising on the front and back of all of the panels, to promote the goods and/or services to consumers whether those panels are in the lowered position or the raised position.

5. A method as claimed in claim 1, wherein the vehicle is used to promote electronic goods and/or services.

6. A method as claimed in claim 1, wherein the goods, and/or information about the services, rest on the display area.

7. A method as claimed in claim 1, wherein the goods, and/or information about the services, are attached to the display area.

8. A method as claimed in claim 1, wherein the goods, and/or information about the services, are attached to the display area.

9. A method as claimed in claim 1, wherein said vehicle is a gas powered vehicle.

10. A method as claimed in claim 1, wherein said self-propelled vehicle is an electrically powered vehicle.

11. A method, comprising:

(a) using a self-propelled moving vehicle to promote goods and/or services;

(b) wherein the vehicle comprises a cab, and a showroom located behind and attached to the cab;

(c) wherein the showroom comprises a display platform, the display platform comprising at least one elevated display surface, the display platform being used to display goods and/or services for promotion of the goods and/or services to consumers, wherein the goods or information about the services are on at least one of the display surfaces, and wherein at least one display surface is provided on a left side of the vehicle, on a right side of the vehicle, and on a rear of the vehicle, wherein the consumer can touch goods on at least one of the surfaces or information about the services on at least one of the display surfaces, and wherein the display surfaces are horizontal surfaces elevated above the feet of the consumer when the consumer is standing next to the goods in the showroom or the information about the services in the showroom;

(d) the showroom comprising panels, the panels comprising a left side panel at the left side of the vehicle, a right side panel at the right side of the vehicle, and a rear panel at the rear of the vehicle;

(e) wherein the left side panel, right side panel, and rear panel each has a lowered position and a raised position, wherein the rear panel has a front surface and a back surface, and wherein advertising is provided on the front surface and the back surface of the rear panel so that the advertising can be seen when the rear panel is in the lowered position and when the rear panel is in the raised position;

(f) wherein the panels surround the showroom on three sides; and, (g) wherein a consumer can touch the display platform while the showroom is attached to said cab and while the panels are all in the raised position.

12. A method as claimed in claim 11, wherein the showroom comprises a roof, and wherein the panels each have a top when in the raised position, each of the tops of the panels being above the roof of the showroom when the panels are all in the raised position;

and wherein the panels bar access to the showroom, when the panels are all in the lowered position.

13. A method as claimed in claim 12, further comprising the step of providing advertising on all of the panels, to promote the goods and/or services to consumers and wherein the advertising on all of the panels is at least partially above the roof of the showroom when the panels are in the raised position.

14. A method as claimed in claim 11, further comprising the step of providing advertising on all of the panels, to promote the goods and/or services to consumer whether the panel is in the lowered position or the raised position.

15. A method as claimed in claim 12, further comprising the step of providing advertising on the front and back of all of the panels, to promote the goods and/or services to consumers whether the panels are in the lowered position or the raised position.

16. A method as claimed in claim 11, wherein the vehicle is used to promote electronic goods and/or services.

17. A method as claimed in claim 11, wherein the goods, and/or information about the services, rest on the display platform.

18. A method as claimed in claim 11, wherein the goods, and/or information about the services, are attached to the display platform.

19. A method as claimed in claim 11, wherein a consumer can touch each of the display surfaces on the right side, left side, and the rear of the vehicle while the panels are in the raised position over that side.

20. A method as claimed in claim 11, wherein said vehicles is a gas-powered vehicle.

21. A method as claimed in claim 11, wherein said self-propelled vehicle is an electrically-powered vehicle.

\* \* \* \* \*